(12) United States Patent
Uchida et al.

(10) Patent No.: US 8,903,611 B2
(45) Date of Patent: Dec. 2, 2014

(54) VEHICLE-OCCUPANT PROTECTION SYSTEM

(71) Applicants: Denso Corporation, Kariya, Aichi-pref. (JP); Fuji Jukogyo Kabushiki Kaisha, Tokyo (JP)

(72) Inventors: Tetsuya Uchida, Nishio (JP); Noriyoshi Baba, Oura-gun (JP); Junichi Oorai, Isesaki (JP); Shoji Doi, Oura-gun (JP); Mitsuhiro Tsujiguchi, Ota (JP); Shinya Motomura, Ota (JP)

(73) Assignees: Denso Corporation, Kariya (JP); Fuji Jukogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/105,597

(22) Filed: Dec. 13, 2013

(65) Prior Publication Data

US 2014/0172237 A1    Jun. 19, 2014

(30) Foreign Application Priority Data

Dec. 17, 2012 (JP) ................. 2012-274592

(51) Int. Cl.
*G06F 17/00* (2006.01)
*B60R 21/0136* (2006.01)
*B60R 21/015* (2006.01)

(52) U.S. Cl.
CPC ... *B60R 21/0136* (2013.01); *B60R 2021/01516* (2013.01); *B60R 2021/01529* (2013.01)
USPC ............... 701/46; 701/45; 340/667; 702/173; 280/735

(58) Field of Classification Search
CPC .................. B60R 21/013; B60R 2021/01516; B60R 2021/01529; B60R 21/0132; B60R 21/0163

USPC ........ 701/45, 46; 340/667; 702/173; 280/735
See application file for complete search history.

(56) References Cited

U.S. PATENT DOCUMENTS

| | | | |
|---|---|---|---|
| 5,416,360 A * | 5/1995 | Huber et al. | 307/10.1 |
| 6,256,564 B1 * | 7/2001 | Miyaguchi et al. | 701/45 |
| 6,341,252 B1 * | 1/2002 | Foo et al. | 701/45 |
| 7,502,677 B2 * | 3/2009 | Weichenberger et al. | 701/45 |
| 7,782,218 B2 * | 8/2010 | Krempl et al. | 340/667 |
| 7,896,392 B2 * | 3/2011 | Oowada et al. | 280/735 |
| 2006/0069483 A1 | 3/2006 | Hayasaka et al. | |
| 2007/0152433 A1 * | 7/2007 | Weichenberger et al. | 280/735 |
| 2008/0204263 A1 * | 8/2008 | Krempl et al. | 340/667 |
| 2010/0030433 A1 * | 2/2010 | Suzuki | 701/45 |
| 2011/0022275 A1 | 1/2011 | Oosaki | |
| 2012/0136541 A1 * | 5/2012 | Inamoto | 701/45 |

FOREIGN PATENT DOCUMENTS

| | | |
|---|---|---|
| JP | 2006-088912 | 4/2006 |
| JP | 2011-025760 | 2/2011 |

* cited by examiner

*Primary Examiner* — McDieunel Marc
(74) *Attorney, Agent, or Firm* — Harness, Dickey & Pierce, PLC

(57) ABSTRACT

A vehicle-occupant protection system in a vehicle has a first sensor and a second sensor on a lateral side closer to a seat of an occupant. The first sensor is either forward of or lateral to the seat of the occupant in the front-rear direction of the vehicle. The second sensor is rearward of the first sensor. The system further includes a collision determination section, which concludes an occurrence of a collision when a signal of the first sensor exceeds a determination threshold value in a situation where a signal of the second sensor has not exceeded a determination threshold value. Upon concluding the occurrence of the collision, the collision determination section activates a movement restraint device to restrain the occupant from moving away from the seat.

13 Claims, 15 Drawing Sheets

VEHICLE-OCCUPANT PROTECTION SYSTEM

CROSS REFERENCE TO RELATED APPLICATION

The present application is based on Japanese Patent Application No. 2012-274592 filed on Dec. 17, 2012, the disclosure of which is incorporated herein by reference.

TECHNICAL FIELD

The present disclosure relates to a vehicle-occupant protection system that protects an occupant of a vehicle from a vehicle collision.

BACKGROUND ART

Patent Literature 1: JP 2006-088912 A (US 2006/0069483 A1)

Patent Literature 1 discloses a vehicle-occupant protection system which is mounted in a vehicle to protect an occupant of the vehicle from a vehicle collision. The vehicle-occupant protection system includes, for example, an airbag and a pretensioner. The airbag deploys upon a vehicle collision to protect the occupant. The pretensioner binds (holds) the occupant for protection purposes before the occupant moves forward during the vehicle collision.

A conventional vehicle-occupant protection system includes a sensor and a collision determination section. The sensor detects a vehicle collision. In accordance with a detection signal from the sensor, the collision determination section determines whether a vehicle collision has occurred. When the collision determination section concludes that a vehicle collision has occurred, it activates protection means such as the airbag and the pretensioner.

In recent years, it is demanded that the vehicle-occupant protection system be applicable not only to a front-rear collision and a lateral collision, but also to a front oblique collision (oblique collision). In an oblique collision, a collision target collides against the vehicle in an oblique direction of the vehicle (in a direction from a front-oblique point to the vehicle). If, for example, an oblique collision occurs against a front door of the vehicle, the occupant relatively moves toward the collision target (collision spot) due to inertia. Such an occupant movement decreases the clearance between the collision target (collision spot) and the occupant. This might increase the value of damage received by the occupant. When the above-described oblique collision occurs, it is beneficial to suppress an increase in the value of damage received by the occupant by activating the pretensioner to provide an adequate clearance between the collision target and the occupant.

However, the conventional vehicle-occupant protection system provides occupant protection during an oblique collision under the same conditions as for a lateral collision. In other words, the oblique collision is handled in the same way as the lateral collision. In this instance, it is probable that the occupant may be inadequately protected during the oblique collision. Particularly, an increase in the value of damage caused by the movement of the occupant may not be sufficiently suppressed.

SUMMARY

It is an object of the present disclosure to provide a vehicle-occupant protection system that is capable of providing occupant protection during a vehicle collision with increased certainty.

In order to achieve the above object, the inventors of the present application have found that a front sensor makes a determination about a vehicle collision earlier than a rear sensor, and have completed the present disclosure.

According to a first aspect of the present disclosure, a vehicle-occupant protection system in a vehicle is provided to include a first sensor, a second sensor, a movement restraint device, and a collision determination section. The vehicle has a first lateral side and a second lateral side. That is, the first lateral side is one of the left side or the right side of the vehicle. The first lateral side is positioned to be closer to an occupant seat of an occupant of the vehicle than the second lateral side is. The first sensor is disposed on the first lateral side and positioned either forward of or lateral to the occupant seat in a front-rear direction (i.e., a longitudinal direction) of the vehicle to detect a collision in a width direction (i.e., a lateral direction or a left-right direction) of the vehicle. The second sensor is disposed on the first lateral side and positioned rearward of the first sensor in a front-rear direction of the vehicle to detect a collision in a width direction of the vehicle. The movement restraint device is provided to the occupant seat to restrain the occupant in the occupant seat from moving away from the occupant seat. The collision determination section compares a first detection signal from the first sensor and a second detection signal from the second sensor with a first determination threshold value and a second determination threshold value, respectively, to determine whether a collision has occurred. The collision determination section concludes that a collision has occurred and activates the movement restraint device when the first detection signal of the first sensor exceeds the first determination threshold value in a situation where the second detection signal of the second sensor has not exceeded the second determination threshold value.

More specifically, the determination about a vehicle collision is made when the detection signal (or signal value) of the first sensor, which is positioned lateral to or forward of an occupant seat, has exceeded its determination threshold value in a situation where the detection signal (or signal value) of the second sensor, which is positioned rearward, has not exceeded its determination threshold value.

When an oblique collision occurs, a sensor (equivalent to the first sensor) positioned relatively forward receives the impact of the collision and allows its detection signal to exceed its determination threshold value earlier than a sensor (equivalent to the second sensor) positioned relatively rearward and apart from a collision point. In other words, the determination about the oblique collision can be made solely from the detection signal of the sensor positioned relatively forward and close to the collision point. Further, the determination about the oblique collision can be made with increased promptness because the determination about the oblique collision is made solely from the detection signal of the sensor positioned relatively forward and without having to use the sensor positioned relatively rearward. This makes it possible to provide vehicle-occupant protection with increased promptness.

Subsequently, when the collision determination section concludes that the collision has occurred, it activates a movement restraint device. The movement restraint device then restrains the movement of an occupant in the occupant seat and provides an adequate clearance between the occupant and the collision spot.

According to a second aspect of the present disclosure, a vehicle-occupant protection system in a vehicle is provided to include a first sensor, a second sensor, a safing sensor, a movement restraint device, and a collision determination section. The vehicle has a first lateral side and a second lateral side. The first lateral side is positioned to be closer to an occupant seat of an occupant of the vehicle than the second lateral side is. The first sensor is disposed on the first lateral side and positioned either forward of or lateral to the occupant seat in a front-rear direction of the vehicle to detect a collision in a width direction of the vehicle. The second sensor is disposed on the first lateral side and positioned rearward of the first sensor in a front-rear direction of the vehicle to detect a collision in a width direction of the vehicle. The safing sensor detects a collision in a width direction of the vehicle and provides redundancy of the first sensor. The movement restraint device is provided to the occupant seat to restrain the occupant in the occupant seat from moving away from the occupant seat. The collision determination section compares a first detection signal from the first sensor, a second detection signal from the second sensor, and a third detection signal from the safing sensor with a first determination threshold value, a second determination threshold value and a third determination threshold value, respectively, to perform a determination of an occurrence of a collision. The collision determination section includes a determination hold section that holds a state of the determination of each of the first sensor and the second sensor; the state of the determination is referenced whether to indicate an occurrence of a collision when the first detection signal of the first sensor exceeds the first determination threshold value or the second detection signal of the second sensor exceeds the second determination threshold value. Herein, at a first time when the first detection signal of the first sensor exceeds the first determination threshold value, the collision determination section concludes that a collision has occurred under a condition that the state of the determination held at the first time by the determination hold section does not indicate an occurrence of a collision while the second detection signal of the second sensor has not exceeded the second determination threshold value at the first time. The collision determination section activates the movement restraint device when the third detection signal of the safing sensor exceeds the third determination threshold value following concluding that the collision has occurred.

More specifically, the collision determination section includes a determination hold section that holds a state of the determination of each of the first sensor and second sensor concerning a collision. When a collision occurs, the collision determination section references each sensor's determination state that is held in the determination hold section. In other words, referencing the determination state of each sensor makes it possible to determine whether a significant collision has occurred. As the collision determination section references the determination state of each sensor, it is possible to avoid an erroneous determination.

When the detection signal of the first sensor exceeds its determination threshold value in a situation where the detection signal of the second sensor has not exceeded its determination threshold value, the collision determination section concludes that a collision has occurred. Further, when the detection signal of the safing sensor exceeds its determination threshold value, the collision determination section activates the movement restraint device. As the collision determination section references the determination state of the safing sensor, it is possible to avoid an erroneous determination with increased certainty.

BRIEF DESCRIPTION OF THE DRAWINGS

The above and other objects, features, and advantages of the present disclosure will become more apparent from the following detailed description made with reference to the accompanying drawings. In the drawings.

DETAILED DESCRIPTION

[First Vehicle-Occupant Protection System]

Figure 1:
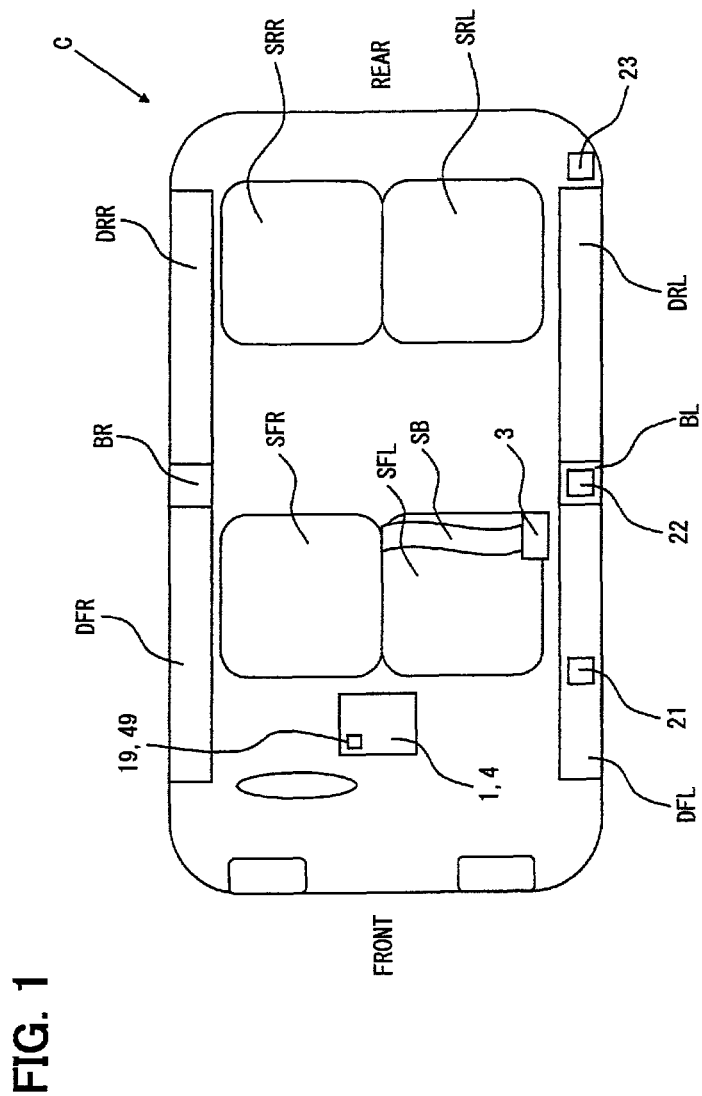
FIG. 1 is a schematic diagram illustrating the configuration of a vehicle in which a vehicle-occupant protection system according to a first embodiment of the present disclosure is mounted.

A first vehicle-occupant protection system, which is mounted in a vehicle, according to the present disclosure includes a first sensor, a second sensor, a movement restraint device, and a collision determination section. The first sensor is disposed on one of a pair of lateral sides of a vehicle that is close to a seat of an occupant (i.e., a vehicle occupant) of the vehicle to detect a vehicle collision in the direction of vehicle width. The first sensor is positioned either forward of the occupant seat in the front-rear direction of the vehicle or lateral to the occupant seat. The second sensor is disposed on one of the lateral sides of the vehicle and rearward of the first sensor in the front-rear direction of the vehicle to detect a vehicle collision in the direction of vehicle width. The movement restraint device is provided for the occupant seat to restrain the occupant in the occupant seat from moving away from the occupant seat. The collision determination section compares detection signals from the sensors to determination threshold values, i.e., the collision determination section estimates detection signals from the sensors using determination threshold values, in order to determine whether a collision has occurred.

The first vehicle-occupant protection system includes the first sensor and the second sensor. These two sensors are disposed on one of the pair of lateral sides of the vehicle that is close to the occupant seat in which the occupant is seated. The pair of lateral sides of the vehicle denote both widthwise sides of the vehicle (i.e., the left and right sides). One of the lateral sides that is close to the occupant seat denotes the right side of the vehicle when the occupant seat is on the right side or denotes the left side of the vehicle when the occupant seat is on the left side.

Further, the first sensor is disposed forward of or lateral to the occupant seat in the front-rear direction of the vehicle, and the second sensor is disposed rearward of the first sensor in the front-rear direction of the vehicle. In other words, the first sensor is disposed forward of the occupant seat of the vehicle (forward of a lateral side of the occupant seat), and the second sensor is disposed rearward of the first sensor. This ensures that the occupant is certainly protected when an oblique collision occurs at one lateral side of the vehicle and at a position relatively forward of the occupant to be protected.

The second sensor should be disposed rearward of the first sensor in the front-rear direction of the vehicle. However, it is preferred that the second sensor be disposed at a predetermined distance from the first sensor and positioned rearward of the occupant seat.

The first sensor and second sensor detect a widthwise collision of the vehicle. The force exerted during the collision to be detected has a widthwise component. Using a sensor detecting a widthwise collision makes it possible to detect not only a lateral collision but also an oblique collision.

Details of the configurations of the first sensor and second sensor are not specifically limited except that they detect the widthwise collision of the vehicle. In other words, the sensors to be used may be the same as those conventionally used to protect the occupant during a lateral collision. A pressure sensor for measuring pressure changes in a door of the vehicle and an acceleration sensor for measuring the widthwise acceleration of the vehicle may be used as the first sensor and second sensor.

Further, sensors mounted in a conventional vehicle-occupant protection system that protects the occupant from a lateral collision may be used (commonly used) as the first sensor and second sensor.

The movement restraint device is a means that is provided for the occupant seat to restrain the occupant in the occupant seat from moving away from the occupant seat. The movement restraint device restrains the occupant from colliding against the inner wall of a vehicle compartment by restraining the movement of the occupant. Particularly, when activated upon a collision, the movement restraint device is capable of inhibiting the occupant from moving toward a collision target (collision spot) due to inertia. This makes it possible to provide an adequate clearance between the occupant and the collision target (collision spot).

The movement restraint device is not specifically limited except that it restrains the movement of the occupant. For example, a pretensioner that removes slack from a seat belt and restrains the seat belt from being pulled out may be used as the movement restraint device.

The collision determination section is a means that compares the detection signals from the sensors to the determination threshold values in order to determine whether a collision has occurred. The detection signals from the sensors are not limited in type. They may be signals output from the sensors or signals subjected to an inversion, amplification, or integration process. The determination threshold values are threshold values used in the vehicle-occupant protection system to determine whether a collision has occurred, and set as appropriate. For example, the determination threshold values for an oblique collision are different from threshold values used to make a determination about a lateral collision or a longitudinal collision (a collision in a forward or backward direction). However, the determination threshold values for the oblique collision may be the same as those used to make a determination about the lateral collision.

The determination threshold values may be either predetermined or calculated in accordance with vehicle conditions. Further, when compared to the detection signals of the sensors, the determination threshold values should make it possible to determine whether a collision has occurred. The determination threshold values may be such that they are used to determine an oblique collision when values derived from the detection signals are greater or smaller than predetermined threshold values or when the values derived from the detection signals are within predetermined ranges (threshold value ranges).

The collision determination section may use a means that makes a determination about a collision in the conventional vehicle-occupant protection system, such as an arithmetic unit (ECU).

When the detection signal of the first sensor exceeds its determination threshold value in a situation where the detection signal of the second sensor has not exceeded its determination threshold value, the collision determination section concludes that an oblique collision (i.e., a front oblique collision) has occurred, and activates the movement restraint device.

More specifically, when the detection signal of the first sensor, which is positioned lateral to or forward of the occupant seat, exceeds its determination threshold value in a situation where the detection signal of the second sensor, which is positioned relatively rearward, has not exceeded its determination threshold value (no collision is found to have occurred), the collision determination section concludes that an oblique collision (i.e., a front oblique collision) has occurred.

The seat for the occupant to be protected from a collision is positioned relatively rearward of a collision site. More specifically, when a collision occurs, the vehicle deforms. It is highly probable that the deformation of the vehicle may reduce the clearance between the collision site and the occupant. Hence, it is particularly requested that the occupant be protected from a collision occurring relatively forward of the occupant seat (a lateral collision or an oblique collision). Thus, the first sensor is disposed at a position close to the collision site rather than the occupant.

In general, the impact of collision propagates with a delay that increases with an increase in the distance from the collision site. In other words, the sensors achieve detection (and conclude that a collision has occurred) with a delay that increases with an increase in the distance from the collision site. Such a delay signifies that the first sensor, which is disposed forward of the second sensor, can make a determination about an oblique collision (i.e., a front oblique collision) earlier than the second sensor. More specifically, as the first sensor makes a determination about a collision in a situation where the collision is not found by the second sensor to have occurred, it can be concluded that the vehicle is subjected to the collision from which the occupant should be protected.

Further, it is determined merely from a collision determination by the first sensor that the collision has occurred. In other words, the result of determination made by the second sensor is not used. Hence, the collision is determined without waiting for the second sensor to make a determination. It signifies that the determination of a collision can be achieved promptly.

When the collision determination section concludes that a collision has occurred, it activates the movement restraint device. The movement restraint device then restrains the occupant from moving away from the occupant seat. This makes it possible to provide an adequate clearance between the occupant and the collision spot.

Consequently, the collision from which the occupant should be protected can be determined without an undue delay. As a result, the occupant to be protected can be properly protected (by reducing the value of damage received by the occupant).

When the detection signal of the second sensor exceeds its determination threshold value in a situation where the detection signal of the first sensor has not exceeded its determination threshold value (i.e., when a rear oblique collision occurs), it is preferred that the movement restraint device be disabled.

As mentioned earlier, the time required for the impact of collision to arrive is proportional to the distance from the collision site. When the detection signal of the second sensor exceeds its determination threshold value (when the second sensor concludes that a collision has occurred) in a situation where the second sensor is disposed rearward of the first sensor, it can be determined that a decrease in the clearance between the collision site and the occupant is suppressed. Therefore, the total value of damage received by the occupant can be reduced by activating the movement restraint device for the purpose of preventing the occupant from being damaged.

In contrast, disabling the movement restraint device during an insignificant collision makes it possible to suppress an increase in the cost of making subsequent repairs. More specifically, a seat pretensioner, which is a representative movement restraint device, needs to be replaced once it is activated. Activating the seat pretensioner unnecessarily results in a cost increase because the seat belt needs to be replaced when the seat pretensioner is subsequently repaired.

It is preferred that the movement restraint device be disabled until a predetermined period of disable time elapses. This ensures that the movement restraint device is inhibited from operating erroneously before the period of the disable time elapses.

The disable time is not specifically limited. It may be predetermined and preset in the collision determination section or may be determined in accordance with the determination conditions of the sensors of the vehicle subjected to a collision.

It is preferred that the first vehicle-occupant protection system further include a safing sensor to detect a widthwise collision of the vehicle and provide redundancy of the first sensor, and activate the movement restraint device when the detection signal from the safing sensor exceeds its determination threshold value.

In other words, the safing sensor may be used to determine whether or not to activate (start) the movement restraint device, as is the case with a conventional method of determining a lateral collision. When the detection signals from the first sensor and the safing sensor are used to activate (start) the movement restraint device, the detection signals from two different sensor systems are used. This makes it possible to inhibit the movement restraint device from being erroneously activated (erroneously started). The safing sensor may have the same functionality and configuration as a safing sensor used in the conventional vehicle-occupant protection system.

It is preferred that the first sensor be disposed in a vehicle door, and that the second sensor be disposed in a vehicle pillar. When the first sensor is disposed in the vehicle door with the second sensor disposed in the vehicle pillar, these sensors turn out to be effective in protecting the occupant in an occupant seat close to the door.

[Second Vehicle-Occupant Protection System]

A second vehicle-occupant protection system, which is mounted in a vehicle, according to the present disclosure includes a first sensor, a second sensor, a safing sensor, a movement restraint device, and a collision determination section. The first sensor is disposed on one of a pair of lateral sides of a vehicle that is close to a seat of a vehicle-occupant, and positioned either forward of or lateral to the occupant seat in the front-rear direction of the vehicle to detect a vehicle collision in the direction of vehicle width. The second sensor is disposed on one of the lateral sides of the vehicle and rearward of the first sensor in the front-rear direction of the vehicle to detect a vehicle collision in the direction of vehicle width. The safing sensor detects a vehicle collision in the direction of vehicle width and provides redundancy of the first sensor. The movement restraint device is provided for the occupant seat to restrain the occupant in the occupant seat from moving away from the occupant seat. The collision determination section compares detection signals from the sensors to determination threshold values in order to determine whether a collision has occurred.

The first sensor, the second sensor, the safing sensor, the movement restraint device, and the collision determination section may have the same configuration as those of the earlier-described first vehicle-occupant protection system unless specifically stated otherwise.

The collision determination section includes a determination hold section that holds a state (or result) of determinations of the first sensor and second sensor concerning a collision. In other words, the determination hold section holds a determination of an occurrence of a (previous) collision, which was made immediately before a (new or present) collision. That is, the determination hold section holds the state of determination of the sensors. For instance, the state of determination indicates (i) non-existence of collision occurrence determination or (ii) existence of collision occurrence determination. The non-existence of collision occurrence determination signifies that neither a collision occurrence determination of the first sensor nor a collision occurrence determination of the second sensor is being made. In contrast, the existence of collision occurrence determination signifies that at least either a collision occurrence determination of the first sensor or a collision occurrence determination of the second sensor is being made. As the state of determination held by the determination hold section is referenced, it is possible to determine a collision with increased accuracy. In other words, an erroneous determination can be avoided.

If the state of determination of the first sensor and second sensor, which is held by the determination hold section, does not indicate the occurrence of a collision when the detection signal of the first sensor or second sensor exceeds its determination threshold value, and if the detection signal of the first sensor exceeds its determination threshold value in a situation where the detection signal of the second sensor has not exceeded its determination threshold value, the collision determination section concludes that a collision has occurred. Further, when the detection signal of the safing sensor exceeds its determination threshold value, the collision determination section activates the movement restraint device.

As the collision determination section determines that the determinations of the first sensor and second sensor, which are held by the determination hold section, do not indicate the occurrence of a collision, when the detection signal of the first sensor or second sensor exceeds its determination threshold value, a determination can be made with increased accuracy. More specifically, when the determination of either the first sensor or the second sensor is found to indicate the occurrence of a collision when the determinations of the first sensor and second sensor, which are held by the determination hold section, are referenced in a situation where the detection signal of the first sensor or second sensor has exceeded its determination threshold value, it can be determined that one collision event is ongoing. It is preferred that the determination of whether or not a collision is encountered be made in accordance with a determination made when the detection signal of the first sensor or second sensor exceeds its determination threshold value in a situation where the determinations of the first sensor and second sensor do not indicate the occurrence of a collision. However, when a determination is made while a collision is ongoing, the result of determination may differ from a previous determination result. In other words, an erroneous detection (erroneous determination) may result. Therefore, such an erroneous detection (erroneous determination) is avoided by checking for the occurrence of a collision in accordance with a collision during which the detection signal of the first sensor or second sensor exceeds its determination threshold value in a situation where the determinations of the sensors, which are held by the determination hold section, do not indicate the occurrence of a collision.

The determination of whether or not a collision is encountered is made in a situation where the state of determinations of the first sensor and second sensor, which is held by the determination hold section, does not indicate the occurrence of a collision. Under such a situation, when the detection signal of the first sensor exceeds its determination threshold value whereas the detection signal of the second sensor has not exceeded its determination threshold value, an occurrence of a collision (e.g., a front oblique collision) is determined or concluded. This determination process is similar to the determination process performed by the first vehicle-occupant protection system.

The collision determination section activates the movement restraint device when the detection signal of the safing sensor exceeds its determination threshold value following concluding the occurrence of the collision. Effects produced by the movement restraint device are the same as those produced in the first vehicle-occupant protection system.

It is possible to avoid an erroneous determination of a collision from which the occupant should be protected. As a result, the occupant to be protected can be properly protected (by reducing the value of damage received by the occupant).

After the detection signal of the first sensor or second sensor has exceeded its determination threshold value, it is preferred that a collision detected by the detection signal be determined to be ongoing until a predetermined first period of time elapses.

As a collision detected by the detection signal of the first sensor or second sensor is determined to be ongoing until the predetermined first period of time elapses after the detection signal has exceeded its determination threshold value (after the determination of whether or not the collision is encountered is made), it is possible to avoid an erroneous detection (erroneous determination).

More specifically, even if, after the detection signal of the first sensor exceeds its determination threshold value (after the start of the determination about a collision from which the occupant should be protected), the detection signal of the safing sensor exceeds its determination threshold value after the detection signal of the first sensor no longer exceeds its determination threshold value as the collision terminates within a short period of time, the determination about the collision can be made unless the predetermined first period of time has elapsed. In other words, an erroneous detection (erroneous determination) can be avoided.

It is preferred that the predetermined first period of time represent the time required for the first sensor and second sensor to determine that the collision is terminated. When the predetermined first period of time is the time required for the first sensor and second sensor to determine that the collision is terminated (the time required for the two sensors to conclude that no collision is encountered), an erroneous detection (erroneous determination) can be avoided with increased certainty.

It is preferred that the movement restraint device be disabled in a situation where the state of determinations of the first sensor and second sensor, which is held by the determination hold section, does not indicate the occurrence of a collision when the detection signal of the second sensor exceeds its determination threshold value while the detection signal of the first sensor is not above its determination threshold value (e.g., when a rear oblique collision has occurred).

As mentioned above, the time required for the impact of collision to arrive is proportional to the distance from the collision site. The second sensor is disposed rearward of the first sensor. When the detection signal of the second sensor exceeds its determination threshold value (when the second sensor concludes that a collision is encountered), it can be determined that a decrease in the clearance between the collision site and the occupant is suppressed. As the movement restraint device is activated to prevent the occupant from being damaged, it is possible to reduce the total value of damage received by the occupant.

In contrast, disabling the movement restraint device during an insignificant collision makes it possible to suppress an increase in the cost of making subsequent repairs. More specifically, a pretensioner, which is a representative movement restraint device, needs to be replaced once it is activated. Activating the pretensioner unnecessarily results in a cost increase because the seat belt needs to be replaced as a unit when the pretensioner is subsequently repaired.

It is preferred that the movement restraint device be disabled until a predetermined period of disable time elapses. This inhibits the movement restraint device from being erroneously activated before the disable time elapses.

The disable time is not specifically limited. It may be predetermined and preset in the collision determination section or may be determined in accordance with the determination conditions of the sensors of the vehicle subjected to a collision.

When the state of determination of at least one of the sensors, which is held by the determination hold section, indicates the occurrence of a collision, it is preferred that the determination of the first sensor or second sensor about the collision be nullified.

When it is determined by the determination hold section that the state of determination of at least one of the sensors indicates the occurrence of a collision, it can be concluded that a previous collision is ongoing. Thus, an erroneous detection (erroneous determination) may result as mentioned earlier. When the determination about a collision is nullified in the above state, it is possible to avoid an erroneous operation of the entire system.

It is preferred that the determination about an oblique collision be nullified until the predetermined first period of time elapses. It is also preferred that the determination about an oblique collision be nullified until the state of determination (collision occurrence determinations) of the first, second, and safing sensors, which is held by the determination hold section, indicates that no collision is encountered.

It is preferred that the first sensor be disposed in a vehicle door, and that the second sensor be disposed in a vehicle pillar. When the first sensor is disposed in the vehicle door with the second sensor disposed in the vehicle pillar, these sensors turn out to be effective in protecting the occupant in an occupant seat close to the door.

[Elements Common to First and Second Vehicle-Occupant Protection Systems]

Elements other than those unique to the above-described first and second vehicle-occupant protection systems are not specifically limited. Well-known conventional elements may be used as such common elements.

More specifically, the vehicle on which the sensors, movement restraint device, and collision determination section are mounted is not specifically limited. Further, the connections of the individual elements are not specifically limited. They may be connected in any manner as far as they are allowed to exercise their respective functions.

Airbags (side airbags and curtain airbags) for vehicle-occupant protection may be mounted as the movement restraint device.

When the first and second vehicle-occupant protection systems include side airbags, curtain airbags, or other airbags that protect the vehicle-occupant from a lateral collision, it is preferred that the sensors and other elements disposed to use such airbags be commonly employed as the above-mentioned elements (sensors and collision determination section).

[Embodiments]

Embodiments of a vehicle-mounted vehicle-occupant protection system according to the present disclosure will now be described in detail.

[First Embodiment]

A first embodiment of the present disclosure is a vehicle-occupant protection system disposed in a vehicle (vehicle compartment) C, which is schematically depicted in FIG. 1. The first embodiment corresponds to the first vehicle-occupant protection system according to the present disclosure, which is described earlier.

As shown in FIG. 1, the vehicle C includes four occupant seats (front right, front left, rear right, and rear left seats) and four doors that are provided for and positioned close to the occupant seats. More specifically, the vehicle C includes a front right seat SFR, a front left seat SFL, a rear right seat SRR, a rear left seat SRL, a front right door DFR, a front left door DFL, a rear right door DRR, and a rear left door DRL. B-pillars BR, BL are disposed respectively between the front right door DFR and the rear right door DRR and between the front left door DFL and the rear left door DRL.

The vehicle-occupant protection system includes an electronic control unit (ECU) 1, a plurality of satellite sensors 21, 22, and a pretensioner 3. The ECU 1, the satellite sensors 21, 22, and the pretensioner 3 are connected with communication lines (not shown).

The ECU 1 is disposed substantially at the center of the vehicle C. The ECU 1 checks for a collision to which the vehicle C is subjected, and provides activation control over the pretensioner 3. More specifically, the ECU 1 checks for an oblique collision by comparing the integral value of detection signals from the satellite sensors 21, 22 to a determination threshold value for an oblique collision. Herein, an integral value of a detection signal may be also referred to as a signal value.

Figure 2:
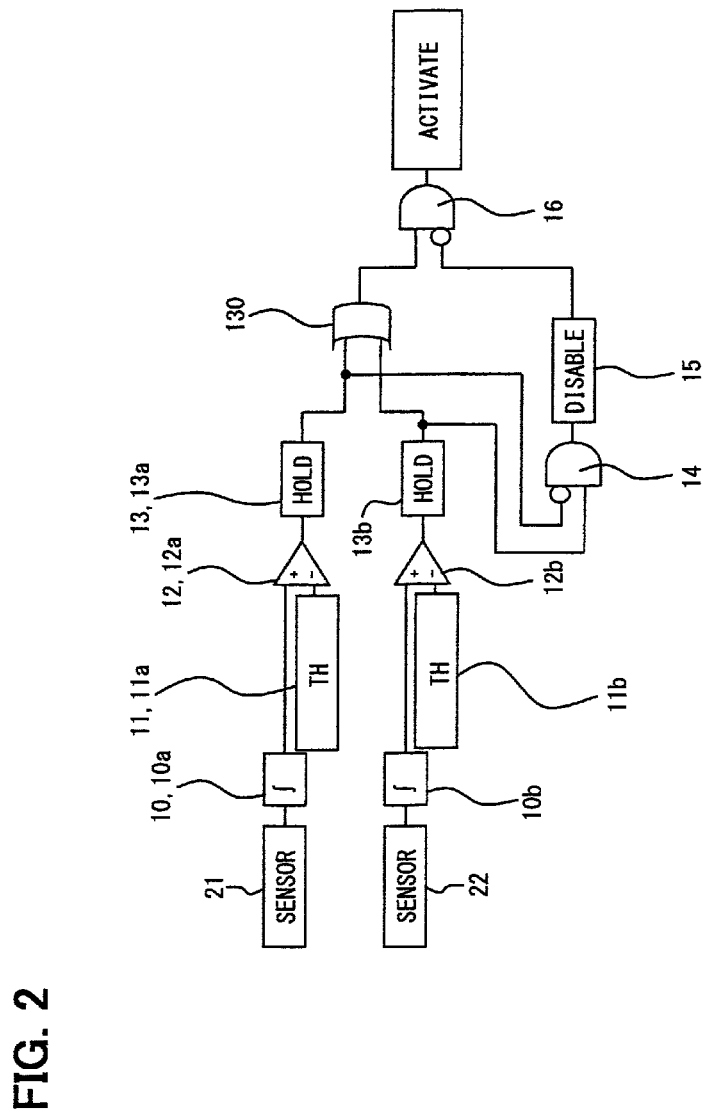
FIG. 2 is a diagram illustrating the configuration of an ECU in the vehicle-occupant protection system according to the first embodiment.

As shown in FIG. 2, the ECU 1 includes integration sections 10 (10a, 10b), threshold value hold sections 11 (11a, 11b), collision determination sections 12 (12a, 12b), output extension sections 13 (13a, 13b), a precedence determination section 14, a disable determination section 15, and an activation section 16.

The integration sections 10 input the detection signals from the sensors 21, 22 and calculate an integral value of the detection signals. The detection signal of the sensor 21 is input to the integration section 10a. The detection signal of the sensor 22 is input to the integration section 10b.

The threshold value hold sections 11 hold predetermined determination threshold values (threshold values for determining a collision). The determination threshold value held by the threshold value hold section 11a is used for a determination about the result of detection by the sensor 21. The determination threshold value held by the threshold value hold section 11b is used for a determination about the result of detection by the sensor 22.

The collision determination sections 12 compare an integral value calculated by the integration sections 10 to a determination threshold value held by the threshold value hold sections 11. When the integral value is greater than the determination threshold value, the collision determination sections 12 determine that an oblique collision is encountered, and output a determination result of "Y (Yes)" (or a true value of 1).

The output extension sections 13 extend the determination result output from the collision determination sections 12 for a predetermined period of time. For example, the output extension sections 13 extend the output of a determination result of "Y", which is output from the collision determination sections 12. A determination result extension provided by the output extension sections 13 corresponds to a section marked "EXTEND" in FIG. 4.

The precedence determination section 14 inputs the determination result, which is produced by the collision determination sections 12, through the output extension sections 13. In accordance with the determination result output from the sensor 21 and with the determination result output from the sensor 22, the precedence determination section 14 determines whether a collision determination of the sensor 21 is preceded by a collision determination of the sensor 22. If, for example, the output extension section 13b outputs a determination result of "Y" in a situation where a determination result of "Y" is not output from the output extension section 13a, the precedence determination section 14 concludes that the collision determination of the sensor 21 is preceded by the collision determination of the sensor 22, and outputs a determination result of "Y".

The disable determination section 15 inputs the determination result of the precedence determination section 14 and disables the pretensioner 3 until a predetermined period of time elapses. When the precedence determination section 14 outputs a determination result of "Y", the disable determination section 15 outputs a signal that disables the pretensioner 3. The predetermined disable time is equivalent to a period of time required for a collision event to terminate.

The activation section 16 not only inputs the determination result of the collision determination sections 12 through the output extension sections 13, but also inputs the signal of the disable determination section 15. When the sensor 21 or the sensor 22 makes a determination about an oblique collision in a situation where the pretensioner 3 is not disabled by the disable determination section 15, that is, when an oblique collision is determined by the sensor 21 in a situation where no collision is determined by the sensor 22, the activation section 16 activates the pretensioner 3.

The ECU 1 includes a circuit board, a central processing unit (CPU), and a safing sensor 19. The central processing unit (CPU) and the safing sensor 19 are mounted on the circuit board.

The satellite sensors are disposed on lateral sides of the vehicle C. More specifically, the satellite sensors are disposed in the doors and in the B-pillars. The satellite sensors are capable of detecting the status of the vehicle in their own way and adapted to detect a lateral collision of the vehicle C.

The vehicle-occupant protection system is configured so that the satellite sensors 21, 22 are disposed in the doors D and in the B-pillars B. As shown in FIG. 1, the left satellite sensor 21 is disposed in the front left door DFL, and the left satellite sensor 22 is disposed in the left B-pillar BL. Satellite sensors other than the two satellite sensors 21, 22 are not shown in the figure.

The pretensioner 3 functions as a movement restraint device that restrains the movement of the occupant. The pretensioner 3 is provided for each vehicle-occupant seat to remove slack from the seat belt SB and certainly fastens the occupant to the occupant seat before the occupant begins to move. The pretensioner 3 is activated (started) by an activation signal from the ECU 1. The pretensioner 3 is disposed in each of the four occupant seats. In FIG. 1, only the pretensioner 3 for the front left seat SFL is shown (the other pretensioners are not shown in the figure).

(Operation of Vehicle-Occupant Protection System)
(Oblique Collision)

Figure 3:
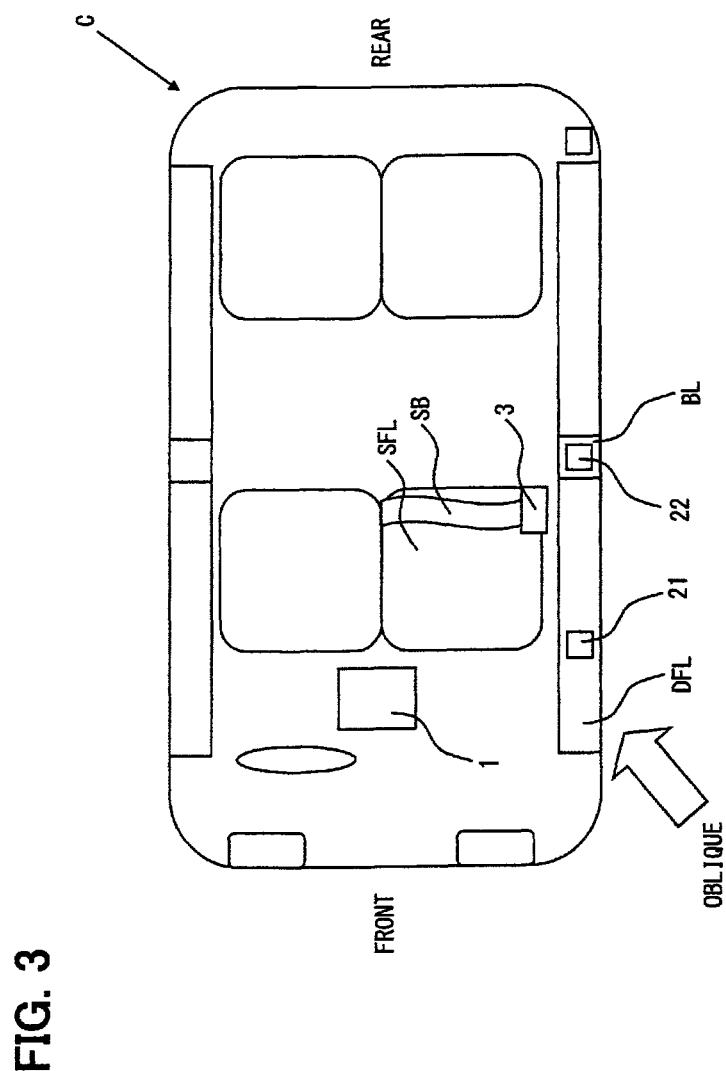
FIG. 3 is a diagram illustrating a vehicle in which the vehicle-occupant protection system according to the first embodiment is mounted is subjected to an oblique collision.
Figure 4:
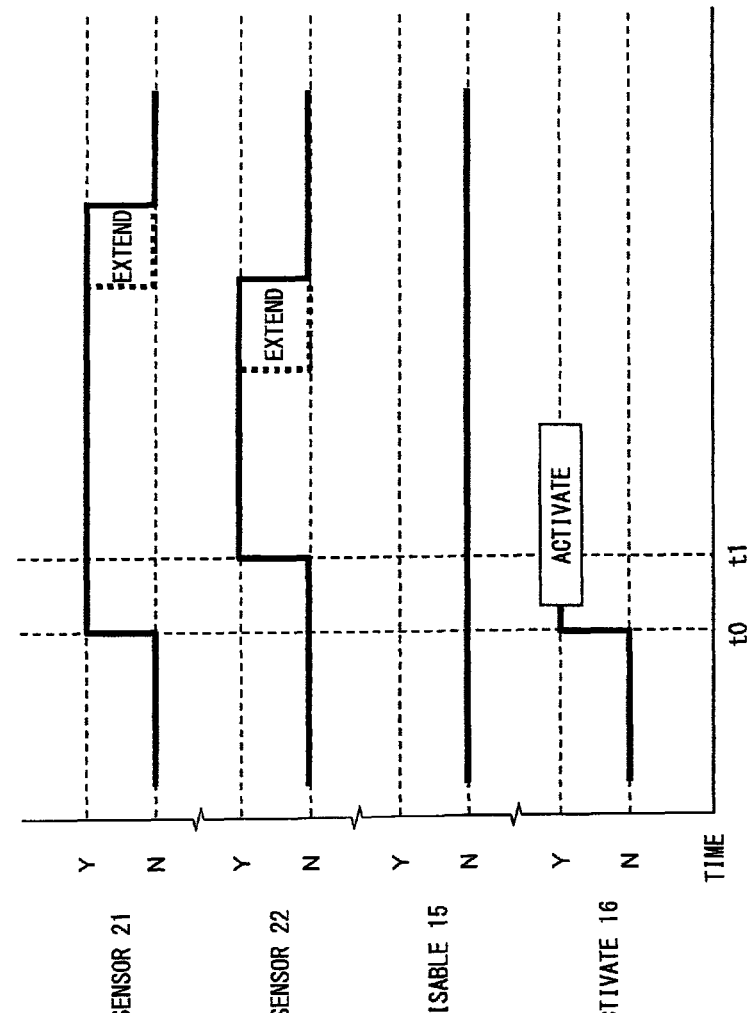
FIG. 4 is a diagram illustrating a determination state of the vehicle-occupant protection system according to the first embodiment concerning an oblique collision.

Operations that are performed by the vehicle-occupant protection system when a collision target obliquely collides against a collision point forward of the front left door DFL of the vehicle C (against a section close to a front left tire) in a direction from a front-oblique point to the vehicle will now be described in detail. The collision spot of the vehicle C is shown in FIG. 3. Determinations made by the sensors 21, 22 in the ECU 1 are shown in FIG. 4 as a determination state.

First of all, the ECU 1 acquires the detection signals of the sensors 21, 22 at predetermined intervals (e.g., at 0.5 ms intervals).

When an oblique collision occurs against the collision point on the vehicle C, the impact of the oblique collision propagates throughout the vehicle C.

When an oblique collision occurs against the vehicle C, its impact is first transmitted to the sensor 21 through the vehicle C and then to the sensor 22. The time required for the transmission of the impact is proportional to the distance from the collision spot. The impact is transmitted to the sensor 21 immediately (at time t0) and then to the sensor 22 with a slight delay from time t0 (at time t1).

No collision is detected in a state prevailing before time t0 at which an oblique collision is detected for the first time. As no collision is detected in such a state by the sensors 21, 22, the comparison between the integral value of the detection signals from the sensors 21, 22 and the determination threshold values does not indicate that the determination threshold values are exceeded by the integral value. Hence, the pretensioner 3 remains deactivated.

When the impact of collision is transmitted to the sensor 21 at time t0, the sensor 21 issues a detection signal, which is based on the impact, to the ECU 1. The integration section 10a inputs the detection signal and then outputs an integral value. The collision determination section 12a inputs the integral value and compares the integral value to the determination threshold value held by the threshold value hold section 11a. When the integral value is greater than the determination threshold value, the collision determination section 12a concludes that a collision is encountered, and then outputs a determination result of "Y".

When the impact of collision is transmitted to the sensor 22 at time t1, which is later than time t0, the sensor 22 issues a detection signal, which is based on the impact, to the ECU 1. The integration section 10b inputs the detection signal and then outputs an integral value. The collision determination section 12b inputs the integral value and compares the integral value to the determination threshold value held by the threshold value hold section 11b. When the integral value is greater than the determination threshold value, the collision determination section 12b concludes that a collision is encountered (i.e., a collision has occurred), and then outputs a determination result of "Y".

First of all, the collision determination section 12a outputs a determination result of "Y" at time t0. At time t0, the collision determination section 12b does not output a determination result of "Y" because it has not completed its collision determination (outputs a determination result of "N (No)").

The determination results of the collision determination sections 12a, 12b are input to the activation section 16 through the output extension sections 13 (13a, 13b), respectively, and through a second collision determination section 130. The second collision determination section 130 inputs the determination results of the collision determination sections 12a, 12b. When the determination result of either the collision determination section 12a or the collision determination section 12b is "Y", the second collision determination section 130 outputs a determination result of "Y" to the activation section 16.

The determination results of the collision determination sections 12a, 12b are input to the precedence determination section 14 through the output extension sections 13 (13a, 13b), respectively. The precedence determination section 14 inputs an inverted signal from the collision determination section 12a, and inputs a non-inverted signal from the collision determination section 12b.

At time t0 at which the collision is encountered, the collision determination section 12a outputs a determination result of "Y", and the collision determination section 12b outputs a determination result of "N". The precedence determination section 14 inputs a two-determination result of "N", concludes that the collision determination of the sensor 21 is not preceded by the collision determination of the sensor 22, and does not output a determination result of "Y" (outputs a determination result of "N").

The activation section 16 inputs a non-inverted signal from the second collision determination section 130 and inputs an inverted signal from the precedence determination section 14 through the disable determination section 15.

When an oblique collision occurs, the second collision determination section 130 outputs a determination result of "Y" and the precedence determination section 14 outputs a determination result of "N", as described above. The activation section 16 then inputs a two-determination result of "Y" and issues an instruction to activate the pretensioner 3 (transmits an activation signal to the pretensioner 3).

The pretensioner 3 is then activated (started) to bind the occupant in the occupant seat SFL (restrain the movement of the occupant) by using the seat belt SB for occupant protection purposes.

In other words, the pretensioner 3 is activated (started) to protect the occupant at time t0 at which the sensor 21 detects a collision and concludes that the collision is encountered. More specifically, it is possible to protect the occupant before time t1 at which the sensor 22 concludes that the collision is encountered.

Consequently, an adequate clearance can be effectively provided between the occupant and the vehicle C.

(Rear Oblique Collision)

Figure 5:
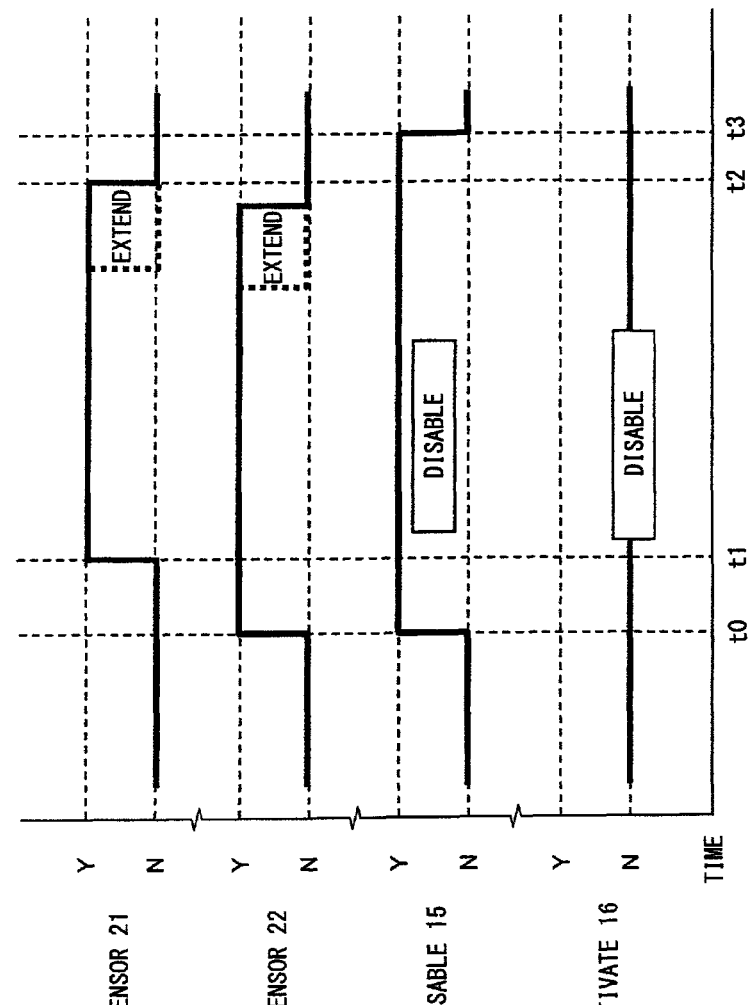
FIG. 5 is a diagram illustrating a determination state of the vehicle-occupant protection system according to the first embodiment concerning a rear oblique collision.

Operations that are performed by the vehicle-occupant protection system when a collision occurs against a section rearward of the rear left door DRL of the vehicle C (against a section close to a rear left tire) will now be described in detail. Determinations made by the sensors 21, 22 in the ECU 1 are shown in FIG. 5 as a determination state in the same manner as in FIG. 4.

When a collision occurs against the vehicle C, the impact of the collision is transmitted to the sensor 22 through the vehicle C and then to the sensor 21. The time required for the transmission of the impact is proportional to the distance from the collision spot. The impact is transmitted to the sensor 22 immediately (at time t0) and then to the sensor 21 with a slight delay from time t0 (at time t1).

When the impact of oblique collision is transmitted to the sensor 22 at time t0, the sensor 22 issues a detection signal, which is based on the impact, to the ECU 1. The integration section 10b inputs the detection signal and then outputs an integral value. The collision determination section 12b inputs the integral value and compares the integral value to the determination threshold value held by the threshold value hold section 11b. When the integral value is greater than the determination threshold value, the collision determination section 12b concludes that a collision is encountered, and then outputs a determination result of "Y".

When the impact of collision is transmitted to the sensor 21 at time t1, which is later than time t0, the sensor 21 issues a detection signal, which is based on the impact, to the ECU 1. The integration section 10a inputs the detection signal and then outputs an integral value. The collision determination section 12a inputs the integral value and compares the integral value to the determination threshold value held by the threshold value hold section 11a. When the integral value is greater than the determination threshold value, the collision determination section 12a concludes that a collision is encountered, and then outputs a determination result of "Y".

First of all, the collision determination section 12b outputs a determination result of "Y" at time t0. At time t0, the collision determination section 12a does not output a determination result of "Y" because it has not completed its collision determination (outputs a determination result of "N").

The determination results of the collision determination sections 12a, 12b are input to the activation section 16 in the same manner as described in conjunction with the foregoing example.

The determination results of the collision determination sections 12a, 12b are input to the precedence determination section 14 through the output extension sections 13 (13a, 13b), respectively. The precedence determination section 14 inputs an inverted signal from the collision determination section 12a, and inputs a non-inverted signal from the collision determination section 12b.

At time t0 at which the collision is encountered and subjected to a determination, the collision determination section 12b outputs a determination result of "Y", and the collision determination section 12a outputs a determination result of "N". The precedence determination section 14 inputs a signal of "Y", which is based on the two determination results, concludes that the collision determination of the sensor 21 is preceded by the collision determination of the sensor 22, and outputs a determination result of "Y".

The disable determination section 15 inputs the determination result of "Y", which is output from the precedence determination section 14. Upon input of the determination result of "Y", the disable determination section 15 disables the pretensioner 3 (outputs a disable signal) until a predetermined period of time (disable time) elapses.

In the present embodiment, as shown in FIG. 5, the disable determination section 15 disables the pretensioner 3 (outputs the disable signal) until time t3, which is later than time t2 at which the sensors 21, 22 both terminate their collision determination.

The activation section 16 inputs a signal (a determination result of "Y") from the second collision determination section 130 and inputs a signal indicative of an inversion of the determination result of "Y" (i.e., a determination result of "N") from the disable determination section 15. Thus, the activation section 16 inputs the determination result of "Y" and the determination result of "N" and does not issue an instruction to activate the pretensioner 3 (does not transmit the activation signal).

As described above, when the sensor 22 has not determined that a collision is encountered and the sensor 21 has determined that a collision is encountered, the present embodiment concludes that the vehicle C is subjected to a collision from which the occupant in the front left seat SFL should be protected, and then activates (starts) the pretensioner 3. If, on the other hand, the sensor 21 has not determined that a collision is encountered and the sensor 22 has determined that a collision is encountered, the present embodiment does not activate (start) the pretensioner 3.

When, as described above, the determination about a collision is made only in accordance with the detection signal of the sensor 21, which is positioned forward, there is no need to use the determination of the sensor 22, which is positioned rearward. This makes it possible to make a determination about a collision at an increased speed and provide vehicle-occupant protection with increased promptness.

Further, when the ECU 1 concludes that a collision is encountered, the present embodiment activates the pretensioner 3. This provides an advantage in that the pretensioner 3 binds the occupant in the occupant seat to restrain the movement of the occupant and provide an increased clearance between the occupant and the collision spot.

In its essence, the ECU 1 concludes that a front oblique collision has occurred in a first case where the detection signal of the sensor 21 exceeds its determination threshold value so that the collision determination section 12a determines an occurrence of a collision under a situation where the detection signal of the sensor 22 has not exceeded its determination threshold value so that the collision determination section 12b has not determined an occurrence of a collision. Following thus concluding the occurrence of the front oblique collision, the ECU 1 activates the pretensioner 3. In contrast, the ECU 1 concludes that a rear oblique collision has occurred in a second case where the detection signal of the sensor 22 exceeds its determination threshold value so that the collision determination section 12b determines an occurrence of a collision under a situation where the detection signal of the sensor 21 has not exceeded its determination threshold value so that the collision determination section 12a has not determined an occurrence of a collision. Following thus concluding the occurrence of the rear oblique collision, the ECU 1 disables an activation of the pretensioner 3. Thus, the ECU 1 may be also referred to as not only a collision determination (or conclusion) section, but also a front-oblique collision determination (or conclusion) section, or a rear-oblique collision determination (or conclusion) section.

[Second Embodiment]

A second embodiment of the present disclosure differs from the first embodiment in that the former additionally uses the detection signal of the safing sensor 19 when making a determination about the activation (start) of the pretensioner 3.

In the second embodiment, the safing sensor 19 is mounted in the ECU 1, as is the case with a conventional safing sensor used to detect a lateral collision.

Figure 6:
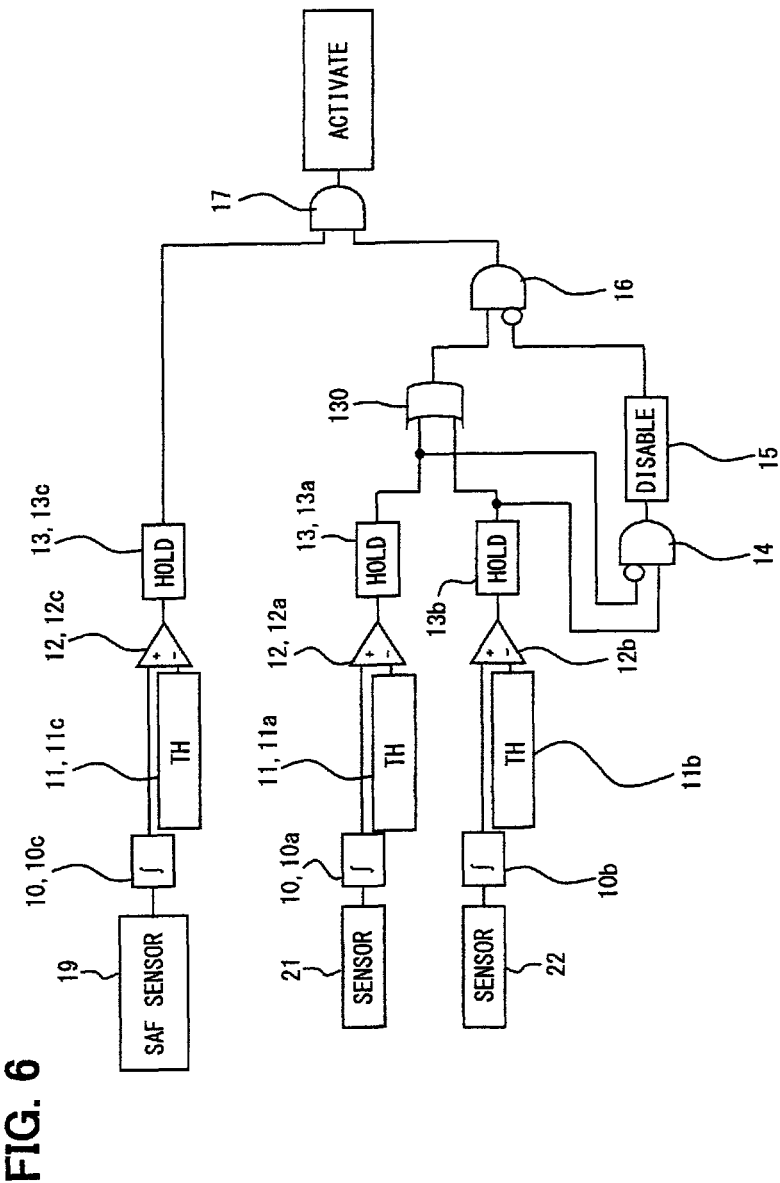
FIG. 6 is a diagram illustrating the configuration of the ECU in the vehicle-occupant protection system according to a second embodiment of the present disclosure.
Figure 7:
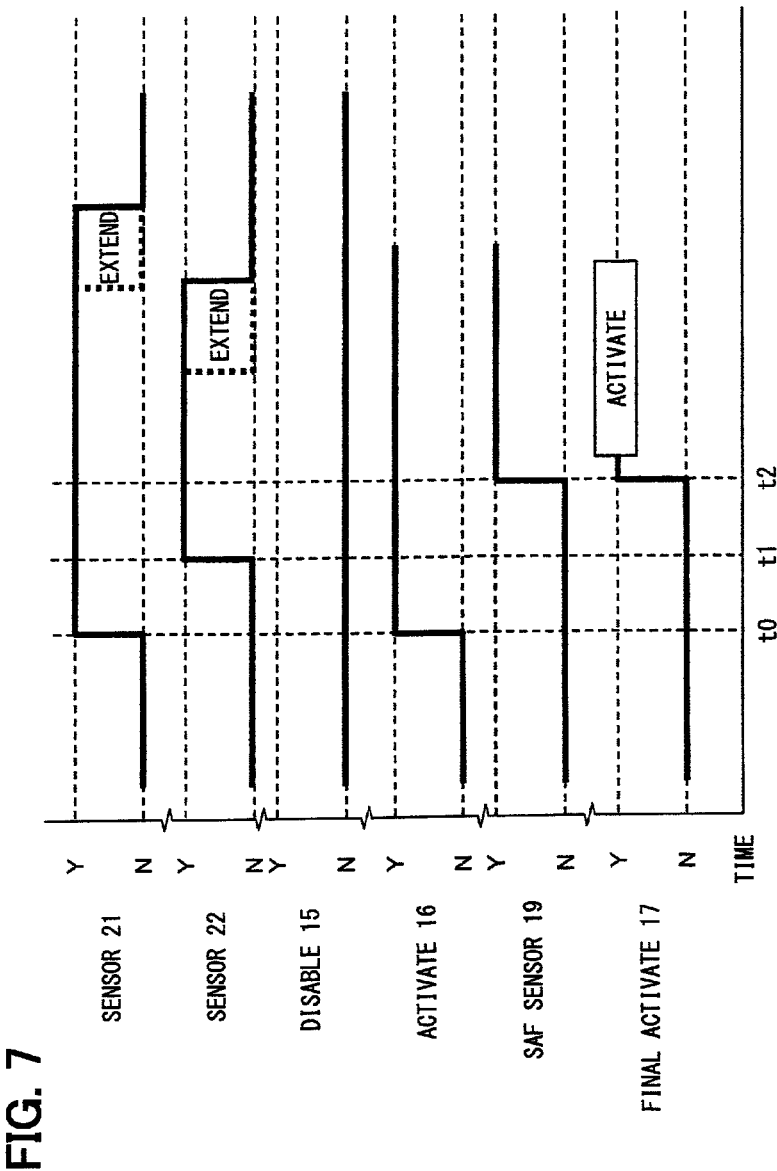
FIG. 7 is a diagram illustrating a determination state of the vehicle-occupant protection system according to the second embodiment concerning an oblique collision.
Figure 8:
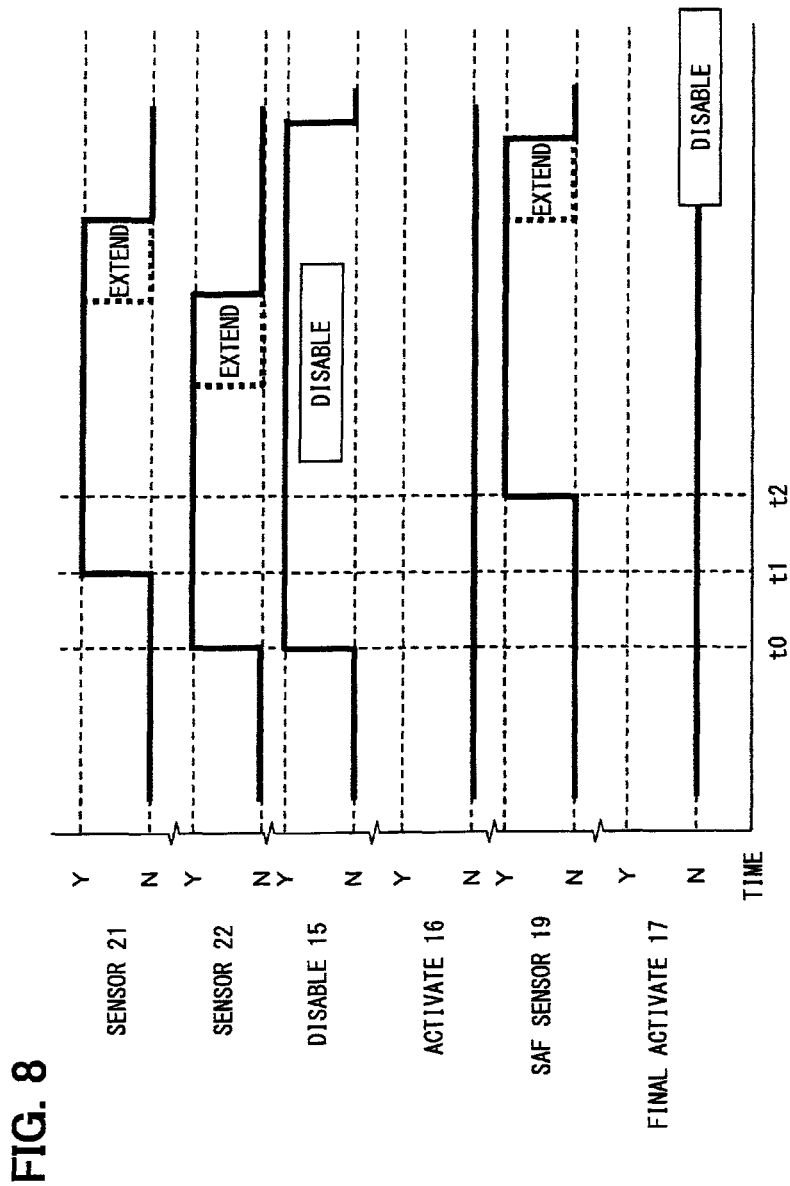
FIG. 8 is a diagram illustrating a determination state of the vehicle-occupant protection system according to the second embodiment concerning a rear oblique collision.

FIG. 6 shows the configuration of the ECU 1 according to the present embodiment in the same manner as FIG. 2. Determinations made by the sensors 21, 22 in the ECU 1 are shown in FIGS. 7 and 8 as a determination state in the same manner as in FIG. 4.

As shown in FIG. 6, the ECU 1 according to the present embodiment differs from the ECU 1 according to the first embodiment in that the former additionally includes a final activation section 17. The final activation section 17 inputs the determination result of the activation section 16 and the determination result of the safing sensor 19.

In the ECU 1 according to the present embodiment, the signal output from the safing sensor 19 is processed through an integration section 10 (10c), a threshold value hold section 11 (11c), a collision determination section 12 (12c), and an output extension section 13 (13c), as is the case in the ECU 1 according to the first embodiment.

In the present embodiment, a determination process performed by various sections including up to the activation section 16 is the same as described in conjunction with the first embodiment.

As described in conjunction with the first embodiment, the safing sensor 19 according to the present embodiment makes a collision determination at time t2, which is later than time t1 at which the sensor 22 makes a collision determination.

When a determination result of "Y" is input from the activation section 16 and a determination result of "Y" is input from the safing sensor 19, the final activation section 17 activates the pretensioner 3 as shown in FIG. 7.

Further, when a determination result of "N" is input from the activation section 16, the final activation section 17 leaves the pretensioner 3 deactivated regardless of whether a determination result of "Y" is input from the safing sensor 19.

When activating (starting) the pretensioner 3, the present embodiment makes a determination by additionally using the determination result of the safing sensor 19, which is disposed substantially at the center of the vehicle. In other words, the present embodiment makes a determination about the activation (start) of the pretensioner 3 in accordance with the determination results of a plurality of different sensor systems. This provides an advantage in that the probability of an erroneous operation is reduced.

[Third Embodiment]

A third embodiment of the present disclosure is a vehicle-occupant protection system disposed in the vehicle (vehicle compartment) C, which is schematically depicted in FIG. 1.

The vehicle-occupant protection system according to the third embodiment includes an electronic control unit (ECU) 4, a plurality of satellite sensors 21, 22, and a pretensioner 3. The ECU 4 is connected to the satellite sensors 21, 22 and to the pretensioner 3 with communication lines (not shown).

The ECU 4 is disposed substantially at the center of the vehicle C. The ECU 4 checks for a collision (oblique collision) to which the vehicle C is subjected, and provides activation control over the pretensioner 3. More specifically, the ECU 4 checks for an oblique collision by comparing the integral value of detection signals from the satellite sensors 21, 22 and from a safing sensor 49 to a determination threshold value for an oblique collision.

Figure 9:
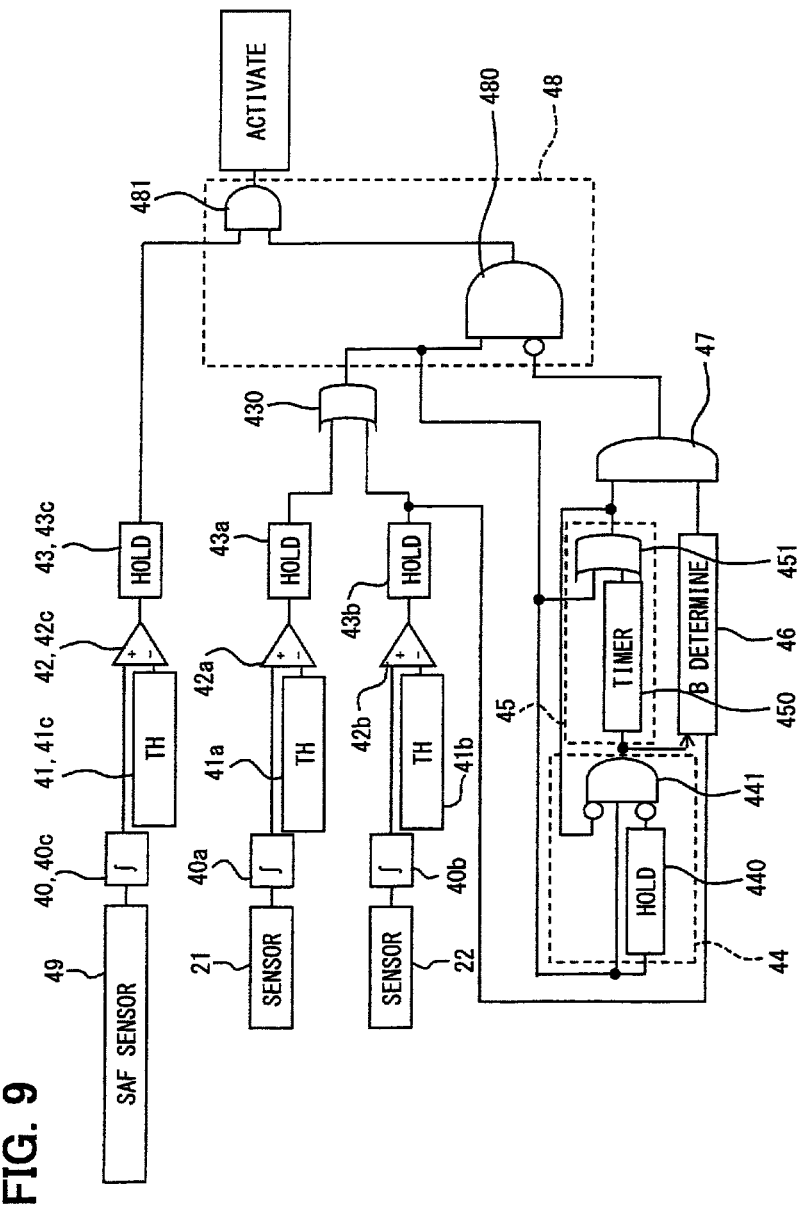
FIG. 9 is a diagram illustrating the configuration of the ECU in the vehicle-occupant protection system according to a third embodiment of the present disclosure.

As shown in FIG. 9, the ECU 4 includes integration sections 40 (40a, 40b, 40c), threshold value hold sections 41 (41a, 41b, 41c), collision determination sections 42 (42a, 42b, 42c), output extension sections 43 (43a, 43b, 43c), a new collision determination circuit 44, a collision progress determination circuit 45, a B-pillar determination section 46, a disable determination section 47, and an activation circuit 48. Further, the ECU 4 has a safing sensor 49, as is the case with the ECU according to the second embodiment.

The integration sections 40, the threshold value hold sections 41, the collision determination sections 42, and the output extension sections 43 have the same configuration as the integration sections 10, threshold value hold sections 11, collision determination sections 12, and output extension sections 13 according to the first and second embodiments, respectively.

The new collision determination circuit 44 determines the start of a collision detected by the vehicle C. The new collision determination circuit 44 includes a determination hold section 440 and a new collision determination section 441.

When the start of a collision detected by the vehicle C is to be determined, the determination hold section 440 holds the state of the determination of the sensor 21, 22 that is made immediately before the collision. When either the sensor 21 or the sensor 22 detects a collision, the determination hold section 440 inputs a detection signal of "Y" from the sensor detecting the collision and inputs a detection signal of "N" from the other sensor. The determination hold section 440 holds the state of determinations of the sensors 21, 22 that are made immediately before the collision. When all the signals input from the sensors are "N", the determination hold section 440 concludes that no collision is encountered, and then outputs a detection signal of "N", which may be referred to as a state of determination indicating non-existence of collision occurrence determination of the sensors 21, 22. When at least one of the signals input from the sensors is "Y", the determination hold section 440 can conclude that a collision causing the output of a detection signal of "Y" is in progress, and then outputs a detection signal of "Y", which may be referred to as a state of determination indicating existence of collision occurrence determination of the sensors 21, 22.

The new collision determination section 441 inputs signals from the determination hold section 440, an output extension section 430, and the collision progress determination circuit 45, and determines whether a relevant collision event is started. More specifically, when no collision other than a collision whose start is to be determined is determined immediately before an oblique collision detected by the vehicle C, the new collision determination section 441 concludes that a new oblique collision is started.

The new collision determination section 441 inputs an inverted signal from the determination hold section 440 and from the collision progress determination circuit 45. More specifically, when either the sensor 21 or the sensor 22 is determining a collision immediately before a collision, the determination hold section 440 outputs a detection signal of "Y". The detection signal of "Y", which is inverted, is input to the new collision determination section 441.

When each of the signals input from the determination hold section 440, the output extension section 430, and the collision progress determination circuit 45 is a detection signal of "Y", the new collision determination section 441 concludes that the associated collision event is started, and then outputs a detection signal of "Y". If, on the other hand, one or more of the input signals are a detection signal of "N" (if, for example, a detection signal of "Y" is output from the determination hold section 440 and from the collision progress determination circuit 45 and a detection signal of "N" is output from the output extension section 430), the new collision determination section 441 concludes that the associated collision event is not an oblique collision to be determined, and then outputs a detection signal of "N".

A signal output from the new collision determination circuit 44 (new collision determination section 441) is output to the collision progress determination circuit 45 and to the B-pillar determination section 46.

The collision progress determination circuit 45 determines whether a collision detected by the vehicle C is in progress. The collision progress determination circuit 45 includes a timer section 450 and a collision progress determination section 451.

The timer section 450 inputs a signal output from the new collision determination circuit 44 (new collision determination section 441), and holds such an output signal for a predetermined period of time. More specifically, when the signal (a detection signal of "Y") output from the new collision determination circuit 44 (new collision determination section 441) is input, the timer section 450 outputs a detection signal of "Y" for the predetermined period of time. In the present embodiment, the "predetermined period of time" during which the result of the output signal is maintained by the timer section 450 is a period of time during which the oblique collision to be determined is in progress.

The collision progress determination section 451 inputs a signal output from the timer section 450 and a signal output from the output extension sections 43, and concludes that the associated collision event is in progress or that the associated collision event is in progress until the predetermined period of time for determining the progress of a collision elapses. When either the signal output from the timer section 450 or the signal output from the output extension section 430 is a detection signal of "Y", the collision progress determination section 451 outputs a detection signal of "Y".

In accordance with the determination of the sensor 22 and with the result of determination by the new collision determination circuit 44 (new collision determination section 441), the B-pillar determination section 46 determines whether or not to prohibit the pretensioner 3 from being activated (started). When the result of determination by the new collision determination circuit 44 (new collision determination section 441) is a detection signal of "Y" and the result of determination by the sensor 22 is a detection signal of "Y", the B-pillar determination section 46 prohibits the pretensioner 3 from being activated (started). If, on the other hand, the result of determination by the new collision determination circuit 44 (new collision determination section 441) is a detection signal of "Y" and the result of determination by the sensor 22 is a detection signal of "N", the B-pillar determination section 46 permits the pretensioner 3 to be activated (started).

In the present embodiment, the B-pillar determination section 46 determines whether or not to prohibit the pretensioner 3 from being activated (started). The output signal of "Y" is a signal that prohibits the pretensioner 3 from being activated (started). The output signal of "N" is a signal that permits the pretensioner 3 to be activated (started).

When a determination about a collision event is made, the B-pillar determination section 46 holds the result of the determination for a predetermined period of time. In the present embodiment, the predetermined period of time during which the result indicated by the output signal is held by the B-pillar determination section 46 may be referred to as the predetermined movement restraint device disable time. It is therefore preferred that the predetermined period of time be at least a period of time during which the oblique collision to be determined is in progress. In the present embodiment, the B-pillar determination section 46 holds the relevant determination until a next new collision is determined.

In the present embodiment, the B-pillar determination section 46 is so named because it makes a determination about the sensor 22 disposed in the B-pillar. In other words, an alternative is to use the result of detection by a vehicle-mounted sensor disposed at a place other than the B-pillar.

The disable determination section 47 determines, in accordance with the result of determination made by the collision progress determination circuit 45 and with the result of determination made by the B-pillar determination section 46, whether or not to prohibit the pretensioner 3 from being activated (started).

More specifically, the disable determination section 47 makes a determination to prohibit the pretensioner 3 from being activated (started) when the result of determination made by the collision progress determination circuit 45 and the result of determination made by the B-pillar determination section 46 are input and both of these two determination results are a detection signal of "Y". When, on the other hand, either of these two determination results is a detection signal of "N", the disable determination section 47 makes a determination to permit the pretensioner 3 to be activated (started).

The disable determination section 47 determines whether or not to prohibit the pretensioner 3 from being activated (started). The output signal of "Y" is a signal that prohibits the pretensioner 3 from being activated (started). The output signal of "N" is a signal that permits the pretensioner 3 to be activated (started).

The activation circuit 48 makes a final determination about whether or not to activate (start) the pretensioner 3. When the pretensioner 3 is determined to be activated (started), the activation circuit 48 outputs an activation signal. The activation circuit 48 includes an initial determination section 480 and a final determination section 481.

The initial determination section 480 determines, in accordance with the result of determination made by the disable determination section 47 and with the results of determination made by the sensors 21, 22, which are transmitted through the output extension sections 43 (the results of determination transmitted through the output extension section 430), whether or not to activate (start) the pretensioner 3.

The initial determination section 480 inputs an inversion of the result of determination made by the disable determination section 47. When the input result of determination made by the disable determination section 47 and the results of determination made by the sensors 21, 22, which are transmitted through the output extension sections 43 (the results of determination transmitted through the output extension section 430), are both a detection signal of "Y", the initial determination section 480 outputs a detection signal of "Y" to permit the pretensioner 3 to be activated (started).

The final determination section 481 inputs the result of determination made by the initial determination section 480 and the result of determination made by the safing sensor 49, which is transmitted through the output extension sections 43. When the pretensioner 3 is determined to be activated (started), the final determination section 481 outputs an activation signal.

When the result of determination made by the initial determination section 480 and the result of determination made by the safing sensor 49, which is transmitted through the output extension sections 43, are input and both a detection signal of "Y", the final determination section 481 transmits an activation signal to the pretensioner 3 in order to permit the pretensioner 3 to be activated (started) (initiate the activation of the pretensioner 3).

(Operation of Vehicle-Occupant Protection System)
(Oblique Collision)

Figure 10:
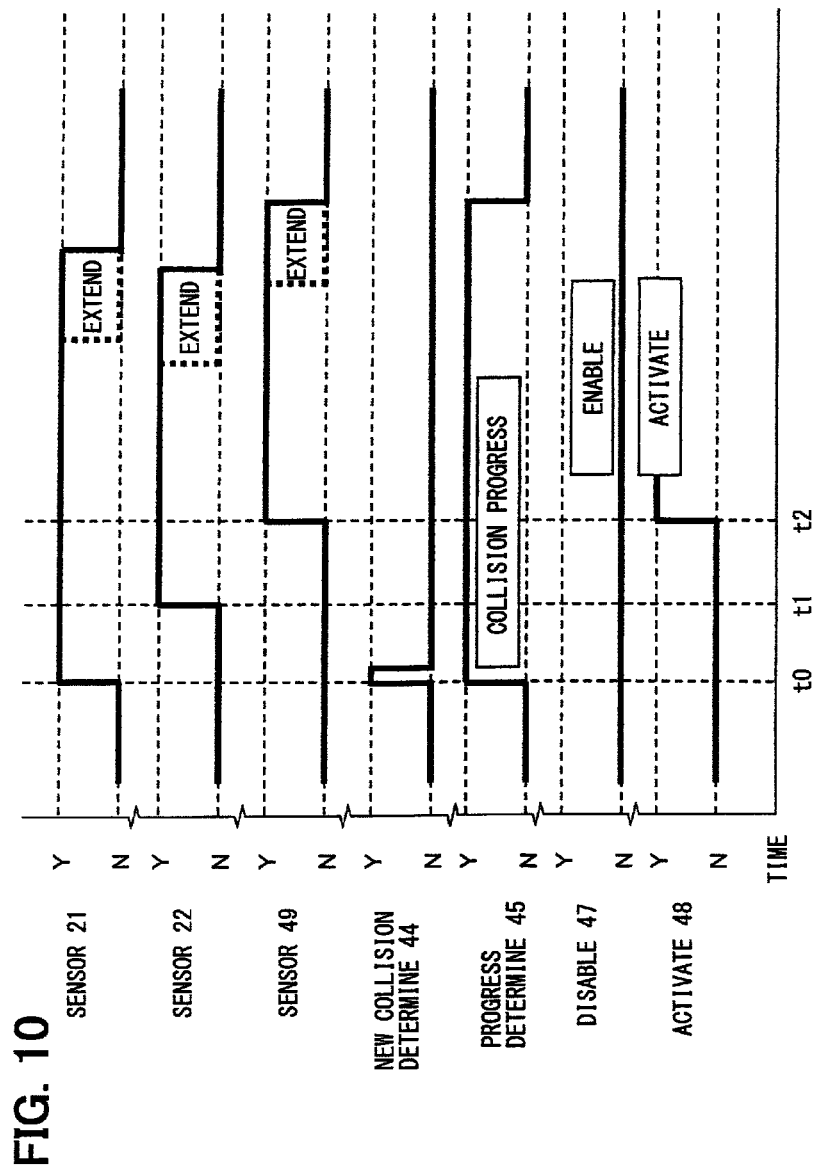
FIG. 10 is a diagram illustrating a determination state of the vehicle-occupant protection system according to the third embodiment concerning an oblique collision.

Operations performed by the vehicle-occupant protection system according to the present embodiment will now be described in detail, as is the case with the vehicle-occupant protection system according to the first embodiment. Operations not described below are the same as those described in conjunction with the first and second embodiments. Determinations made by various sections of the vehicle-occupant protection system according to the present embodiment to determine an oblique collision are shown in FIG. 10 as a determination state in the same manner as in FIG. 4.

It is assumed that, first of all, the vehicle C is subjected to an oblique collision at a collision point shown in FIG. 3. The impact of the oblique collision is transmitted to the sensors 21, 22, 49 through the vehicle C.

No collision is detected (determined) in a state prevailing before time t0 at which a sensor detects an occurrence of a collision. As no oblique collision is detected by the sensors 21, 22, 49, the comparison between the integral value of the detection signals from the sensors 21, 22, 49 and the determination threshold values does not indicate that the determination threshold values are exceeded by the integral value. Hence, the pretensioner 3 remains deactivated.

During a period before time t0, the results of determination made by the sensors 21, 22 are transmitted to the determination hold section 440, which holds the received results or states. The determination hold section 440 holds a detection signal of "N" as the results or states of determination made by the sensors 21, 22.

When a collision occurs against the vehicle C, the impact of the collision is first transmitted to the sensor 21 through the vehicle C, then to the sensor 22, and finally to the safing sensor 49. The time required for the transmission of the impact is proportional to the distance from the collision spot. The impact is transmitted to the sensor 21 immediately (at time t0), then to the sensor 22 with a slight delay from time t0 (at time t1), and finally to the safing sensor 49 with a slight delay from time t1 (at time t2).

(Time t0)

When the impact of collision is transmitted to the sensor 21 at time t0, the sensor 21 issues a detection signal, which is based on the impact, to the ECU 4. The integration section 40a inputs the detection signal and then outputs an integral value. The collision determination section 42a inputs the integral value and compares the integral value to the determination threshold value held by the threshold value hold section 41a. When the integral value is greater than the determination threshold value, the collision determination section 42a concludes that an oblique collision is encountered, and then outputs a detection signal of "Y", which indicates the result of determination.

When either the sensor 21 or the sensor 22 (the output extension section 430) outputs a detection signal of "Y", which indicates the result of determination, the detection signal is transmitted to the new collision determination circuit 44.

In the new collision determination circuit 44, the new collision determination section 441 inputs three determination results, namely, the determination result of either the sensor 21 or the sensor 22 (the output extension section 430), the determination result of the determination hold section 440, and the determination result of the collision progress determination circuit 45. The determination result of the determination hold section 440 and the determination result of the collision progress determination circuit 45 are both input to the new collision determination section 441 in the form of an inverted detection signal.

The determination result of either the sensor 21 or the sensor 22 (the output extension section 430) is a detection signal of "Y". The determination result of the determination hold section 440 is a detection signal of "N". The determination result of the collision progress determination circuit 45 is a detection signal of "N". Each of the signals input to the new collision determination section 441 is a detection signal of "Y". Thus, the associated oblique collision is determined to have started, and then a detection signal of "Y" is output. The new collision determination circuit 44 according to the present embodiment determines whether a collision event is started, as shown in FIG. 10. The new collision determination circuit 44 outputs a detection signal of "Y" and then outputs a detection signal of "N".

The detection signal of "Y", which is output from the new collision determination circuit 44, is transmitted to the collision progress determination circuit 45 and to the B-pillar determination section 46.

The detection signal of "Y", which is input to the collision progress determination circuit 45, is input to the timer section 450. The timer section 450 outputs a detection signal of "Y" until a predetermined period of time elapses. The detection signal of "Y", which is output from the timer section 450, is input to the collision progress determination section 451.

The collision progress determination section 451 inputs the detection signal from the timer section 450 and a detection signal of "Y" indicative of the determination result of either the sensor 21 or the sensor 22 (the output extension section 430) (the detection signal of "Y" input to the new collision determination circuit 44). As both output signals are a detection signal of "Y", the collision progress determination section 451 outputs a detection signal of "Y". The detection signal of "Y" of the collision progress determination circuit 45 is output to the new collision determination circuit 44 (new collision determination section 441) and to the disable determination section 47.

The B-pillar determination section 46 inputs the detection signal indicative of the determination result of the sensor 22 and a detection signal of "Y" indicative of the determination result of the new collision determination circuit 44 (new collision determination section 441). At time t0, the detection signal derived from the sensor 21 is "Y"; however, no collision is detected by the sensor 22. Thus, the sensor 22 outputs a detection signal of "N". In other words, the B-pillar determination section 46 inputs the detection signal of "N" from the sensor 22 and the detection signal of "Y" from the new collision determination circuit 44. The B-pillar determination section 46 outputs a detection signal of "N".

The disable determination section 47 inputs the detection signal of "Y" indicative of the determination result of the collision progress determination circuit 45 and the detection signal of "N" indicative of the determination result of the B-pillar determination section 46. As the detection signal of "N" indicative of the determination result of the B-pillar determination section 46 is input, the disable determination section 47 concludes that the pretensioner 3 is not prohibited from being activated (started), and then outputs a detection signal of "N". The detection signal of "N", which is output from the disable determination section 47, is output to the activation circuit 48.

The detection signal of "N", which is output from the disable determination section 47, is input to the initial determination section 480 of the activation circuit 48.

The initial determination section 480 inputs the detection signal of "N", which is output from the disable determination section 47, in the form of a signal inverted to a detection signal of "Y". The initial determination section 480 inputs the detection signal of "Y", which is output from the disable determination section 47, and inputs a detection signal of "Y" indicative of the determination result of either the sensor 21 or the sensor 22 (the output extension section 430). Then, from the two input detection signals of "Y", the initial determination section 480 outputs a detection signal of "Y" to permit the pretensioner 3 to be activated.

The detection signal of "Y", which is output from the initial determination section 480, is input to the final determination section 481. The final determination section 481 inputs the detection signal from the initial determination section 480 and a detection signal indicative of the determination result of the safing sensor 49.

At time t0, only the sensor 21 outputs a detection signal of "Y", and the sensor 22 and the safing sensor 49 output a detection signal of "N". At time t0, the final determination section 481 inputs a detection signal of "Y" from the initial determination section 480 and a detection signal of "N" indicative of the determination result of the safing sensor 49.

In the present embodiment, the final determination section 481 inputs a detection signal of "Y" and a detection signal of "N", and outputs a detection signal of "N". In other words, at time t0, the final determination section 481 does not permit the pretensioner 3 to be activated (started).

(Time t1)

Time t1, which is later than time t0, is now reached.

When the impact of collision is transmitted to the sensor 22 at time t1, which is later than time t0, the sensor 22 issues a detection signal, which is based on the impact, to the ECU 4. The integration section 40b inputs the detection signal and then outputs an integral value. The collision determination section 42b inputs the integral value and compares the integral value to the determination threshold value held by the threshold value hold section 41b. When the integral value is greater than the determination threshold value, the collision determination section 42b concludes that an oblique collision is encountered, and then outputs a detection signal of "Y", which indicates the result of determination.

The detection signal of "Y", which indicates the determination result of the sensor 22, is transmitted to the new collision determination circuit 44 and to the B-pillar determination section 46.

In the new collision determination circuit 44, the new collision determination section 441 inputs three determination results, namely, the determination result of either the sensor 21 or the sensor 22 (the output extension section 430), the determination result of the determination hold section 440, and the determination result of the collision progress determination circuit 45.

The determination result of either the sensor 21 or the sensor 22 (the output extension section 430) is a detection signal of "Y". The determination result of the determination hold section 440 is a detection signal of "Y" as a collision encountered at time t0 is already detected by the sensor 21. The determination result of the collision progress determination circuit 45 is a detection signal of "Y". The new collision determination section 441 inputs one detection signal of "Y" and two detection signals of "N", and outputs a detection signal of "N".

The detection signal of "N", which is output from the new collision determination circuit 44, is transmitted to the collision progress determination circuit 45 and to the B-pillar determination section 46.

As time t1 is reached before a predetermined period of time for the collision encountered at time t0 elapses, the collision progress determination circuit 45 concludes that a collision event is in progress, and then outputs a detection signal of "Y".

The B-pillar determination section 46 inputs a detection signal of "Y", which indicates the determination result of the sensor 22, and a detection signal of "N", which is output from the new collision determination circuit 44. The B-pillar determination section 46 holds the determination result obtained when the collision occurred at time t0, and outputs a detection signal of "N".

The disable determination section 47 inputs a detection signal of "N", which indicates the determination result of the collision progress determination circuit 45, and a detection signal of "N", which indicates the determination result of the B-pillar determination section 46. From the two input detection signals of "N", the disable determination section 47 outputs a detection signal of "N" as a determination result. The detection signal of "N", which is output from the disable determination section 47, is input to the activation circuit 48.

The activation circuit 48 makes the same determination as at time t0, and outputs a detection signal of "N", which indicates the result of determination. In other words, at time t0, the activation circuit 48 does not permit the pretensioner 3 to be activated (started).

(Time t2)

Time t2, which is later than time t1, is now reached.

When the impact of collision is transmitted to the safing sensor 49 at time t2, which is later than time t1, the safing sensor 49 issues a detection signal, which is based on the impact, to the ECU 4. The integration section 40c inputs the detection signal and then outputs an integral value. The collision determination section 42c inputs the integral value and compares the integral value to the determination threshold value held by the threshold value hold section 41c. When the integral value is greater than the determination threshold value, the collision determination section 42c concludes that an oblique collision is encountered, and then outputs a detection signal of "Y", which indicates the result of determination.

At time t2, the disable determination section 47 makes the same determination as at time t1, and outputs a detection signal of "N".

The initial determination section 480 of the activation circuit 48 inputs the detection signal of "N", which is output from the disable determination section 47, makes the same determination as at time t1, and outputs a detection signal of "Y".

The detection signal of "Y" from the initial determination section 480 is input to the final determination section 481. The final determination section 481 inputs the detection signal from the initial determination section 480 and the detection signal indicative of the determination result of the safing sensor 49.

At time t2, the sensor 22 and the safing sensor 49 output a detection signal of "Y". In other words, at time t2, the final determination section 481 inputs the detection signal of "Y" from the initial determination section 480 and the detection signal of "Y" indicative of the determination result of the safing sensor 49. As a result, the final determination section 481 (activation circuit 48) outputs a detection signal of "Y" to the pretensioner 3 in order to permit the pretensioner 3 to be activated (started).

Upon input of the detection signal of "Y", the pretensioner 3 becomes activated (starts) to bind the occupant in the occupant seat SFL (restrain the movement of the occupant) for occupant protection purposes.

After the occurrence of an oblique collision is determined by the sensor 21, the vehicle-occupant protection system according to the present embodiment activates (starts) the pretensioner 3 at time t2 at which the safing sensor 49 determines the occurrence of the oblique collision. In other words, the activation (start) of the pretensioner 3 is determined in accordance with the determination results of a plurality of different sensors 21, 22, 49. This provides an advantage in that the probability of an erroneous operation is reduced.

(Rear Oblique Collision)

Figure 11:
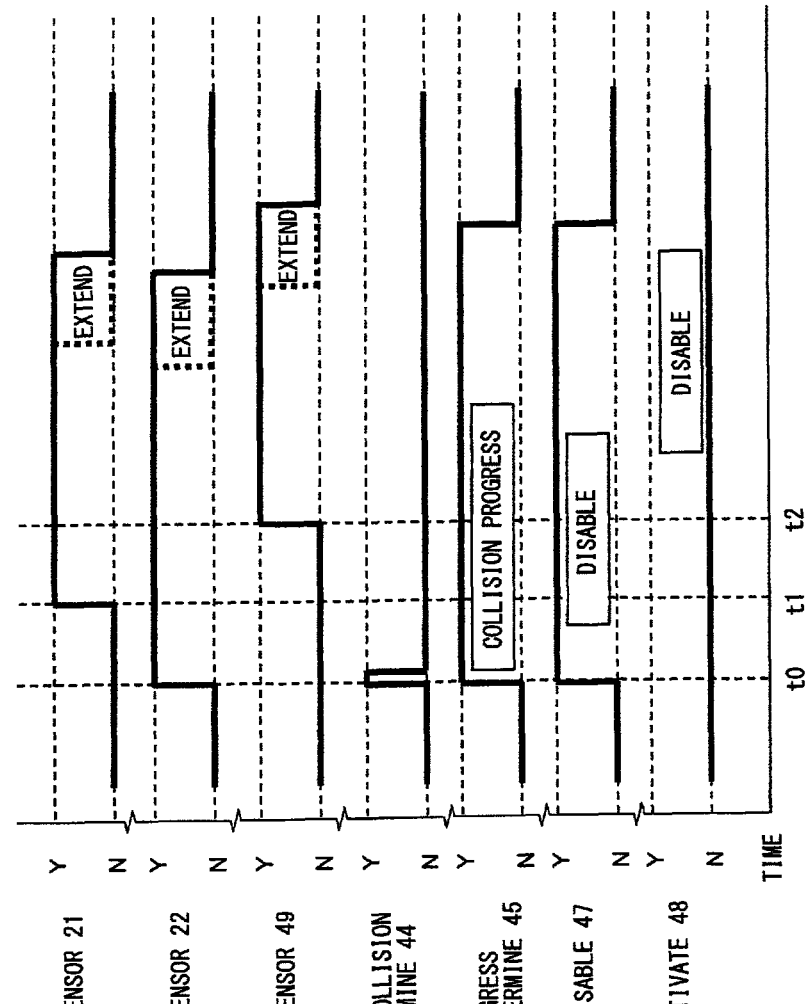
FIG. 11 is a diagram illustrating a determination state of the vehicle-occupant protection system according to the third embodiment concerning a rear oblique collision.

Operations that are performed by the vehicle-occupant protection system when a collision occurs against a section rearward of the rear left door DRL of the vehicle C (against a section close to a rear left tire) will now be described. Determinations made by various sections of the vehicle-occupant protection system in the event of the above collision are shown in FIG. 11 in the same manner as in FIG. 10.

When a collision occurs against the vehicle C at time t0, the impact of the collision is first transmitted to the sensor 22 through the vehicle C, then to the sensor 21, and finally to the safing sensor 49. The time required for the transmission of the impact is proportional to the distance from the collision spot. The impact is transmitted to the sensor 22 immediately (at time t0), then to the sensor 21 with a slight delay from time t0 (at time t1), and finally to the safing sensor 49 with a slight delay from time t1 (at time t2).

(Time t0)

When the impact of collision is transmitted to the sensor 22 at time t0, the sensor 22 issues a detection signal, which is based on the impact, to the ECU 4. The integration section 40b inputs the detection signal and then outputs an integral value. The collision determination section 42b inputs the integral value and compares the integral value to the determination threshold value held by the threshold value hold section 41b. When the integral value is greater than the determination threshold value, the collision determination section 42b concludes that an oblique collision is encountered, and then outputs a determination result of "Y".

In the present embodiment, the collision determination section 42b first outputs a determination result of "Y" at time t0. At time t0, the collision determination section 42a does not output a determination result of "Y" because it has not completed its collision determination (outputs a determination result of "N").

When, in the present embodiment, either the sensor 21 or the sensor 22 (the output extension section 430) outputs a detection signal of "Y", which indicates the result of determination, the detection signal is transmitted to the new collision determination circuit 44.

In the new collision determination circuit 44, the new collision determination section 441 inputs three determination results, namely, the determination result of either the sensor 21 or the sensor 22 (the output extension section 430), the determination result of the determination hold section 440, and the determination result of the collision progress determination circuit 45. The determination result of the determination hold section 440 and the determination result of the collision progress determination circuit 45 are both input to the new collision determination section 441 in the form of an inverted detection signal.

The determination result of either the sensor 21 or the sensor 22 (the output extension section 430) is a detection signal of "Y". The determination result of the determination hold section 440 is a detection signal of "N". The determination result of the collision progress determination circuit 45 is a detection signal of "N". Each of the signals input to the new collision determination section 441 is a detection signal of "Y". Thus, the associated oblique collision is determined to have started, and then a detection signal of "Y" is output.

The detection signal of "Y", which is output from the new collision determination circuit 44, is transmitted to the collision progress determination circuit 45 and to the B-pillar determination section 46.

The detection signal of "Y", which is input to the collision progress determination circuit 45, is input to the timer section 450. The timer section 450 outputs a detection signal of "Y" until a predetermined period of time elapses. The detection signal of "Y", which is output from the timer section 450, is input to the collision progress determination section 451.

The collision progress determination section 451 inputs the detection signal from the timer section 450 and a detection signal of "Y" indicative of the determination result of either the sensor 21 or the sensor 22 (the output extension section 430) (the detection signal of "Y" input to the new collision determination circuit 44). As either of the two output signals is a detection signal of "Y", the collision progress determination section 451 outputs a detection signal of "Y". The detection signal of "Y" of the collision progress determination circuit 45 is output to the new collision determination circuit 44 and to the disable determination section 47.

The B-pillar determination section 46 inputs the detection signal indicative of the determination result of the sensor 22 and a detection signal of "Y" indicative of the determination result of the new collision determination circuit 44 (new collision determination section 441). At time t0, the B-pillar determination section 46 outputs a detection signal of "Y" because the collision is detected by the sensor 22. More specifically, the B-pillar determination section 46 inputs a detection signal of "Y" from the sensor 22 and a detection signal of "Y" from the new collision determination circuit 44. The B-pillar determination section 46 outputs a detection signal of "Y".

The disable determination section 47 inputs the detection signal of "Y" indicative of the determination result of the collision progress determination circuit 45 and the detection signal of "Y" indicative of the determination result of the B-pillar determination section 46. As the detection signal of "Y" indicative of the determination result of the B-pillar determination section 46 is input, the disable determination section 47 concludes that the pretensioner 3 is to be prohibited from being activated (started), and then outputs a detection signal of "Y". The detection signal of "Y", which is output from the disable determination section 47, is output to the activation circuit 48.

The detection signal of "Y", which is output from the disable determination section 47, is input to the initial determination section 480 of the activation circuit 48.

The initial determination section 480 inputs the detection signal of "Y", which is output from the disable determination section 47, in the form of a signal inverted to a detection signal of "N". The initial determination section 480 inputs the detection signal of "N", which is output from the disable determination section 47, and inputs a detection signal of "Y" indicative of the determination result of either the sensor 21 or the sensor 22 (the output extension section 430). Then, from the two input detection signals of "Y" and "N", the initial determination section 480 outputs a detection signal of "N" to prohibit the pretensioner 3 from being activated.

The detection signal of "N", which is output from the initial determination section 480, is input to the final determination section 481. The final determination section 481 inputs the detection signal from the initial determination section 480 and a detection signal indicative of the determination result of the safing sensor 49.

At time t0, only the sensor 22 outputs a detection signal of "Y", and the sensor 21 and the safing sensor 49 output a detection signal of "N". At time t0, the final determination section 481 inputs a detection signal of "N" from the initial determination section 480 and a detection signal of "N" indicative of the determination result of the safing sensor 49.

In the present embodiment, the final determination section 481 inputs two detection signals of "N" and outputs a detection signal of "N". In other words, at time t0, the final determination section 481 does not permit the pretensioner 3 to be activated (started).

(Time t1)

Time t1, which is later than time t0, is now reached.

When the impact of collision is transmitted to the sensor 21 at time t1, which is later than time t0, the sensor 21 issues a detection signal, which is based on the impact, to the ECU 4. The integration section 40a inputs the detection signal and then outputs an integral value. The collision determination section 42a inputs the integral value and compares the integral value to the determination threshold value held by the threshold value hold section 41a. When the integral value is greater than the determination threshold value, the collision determination section 42a concludes that a collision is encountered, and then outputs a detection signal of "Y", which indicates the result of determination.

The detection signal of "Y", which indicates the determination result of the sensor 21, is transmitted to the new collision determination circuit 44 and to the B-pillar determination section 46.

In the new collision determination circuit 44, the new collision determination section 441 inputs three determination results, namely, the determination result of either the sensor 21 or the sensor 22 (the output extension section 430), the determination result of the determination hold section 440, and the determination result of the collision progress determination circuit 45.

The determination result of either the sensor 21 or the sensor 22 (the output extension section 430) is a detection signal of "Y". The determination result of the determination hold section 440 is a detection signal of "Y" as a collision encountered at time t0 is already detected by the sensor 22. The determination result of the collision progress determination circuit 45 is a detection signal of "Y". The new collision determination section 441 inputs one detection signal of "Y" and two detection signals of "N", and outputs a detection signal of "N".

The detection signal of "N", which is output from the new collision determination circuit 44, is transmitted to the collision progress determination circuit 45 and to the B-pillar determination section 46.

As time t1 is reached before a predetermined period of time for the collision encountered at time t0 elapses, the collision progress determination circuit 45 concludes that a collision event is in progress, and then outputs a detection signal of "Y".

The B-pillar determination section 46 inputs a detection signal of "Y", which indicates the determination result of the sensor 21, and a detection signal of "N", which is output from the new collision determination circuit 44. The B-pillar determination section 46 holds the determination result obtained when the collision occurred at time t0, and outputs a detection signal of "Y".

The disable determination section 47 inputs a detection signal of "Y", which indicates the determination result of the collision progress determination circuit 45, and a detection signal of "Y", which indicates the determination result of the B-pillar determination section 46.

From the two input detection signals of "Y", the disable determination section 47 outputs a detection signal of "Y" as a determination result.

The detection signal of "Y", which is output from the disable determination section 47, is input to the activation circuit 48.

The detection signal of "Y", which is output from the disable determination section 47, is input to the initial determination section 480 of the activation circuit 48. The initial determination section 480 inputs a detection signal of "N", which is an inversion of the detection signal of "Y" output from the disable determination section 47, and a detection signal of "Y" indicative of the determination result of either the sensor 21 or the sensor 22 (the output extension section 430). From the two input detection signals of "Y" and "N", the initial determination section 480 outputs a detection signal of "N" in order to prohibit the pretensioner 3 from being activated (started).

The activation circuit 48 makes the same determination as at time t0, and outputs a detection signal of "N", which indicates the result of determination. In other words, at time t1, the activation circuit 48 does not permit the pretensioner 3 to be activated (started).

(Time t2)

Time t2, which is later than time t1, is now reached.

When the impact of collision is transmitted to the safing sensor 49 at time t2, which is later than time t1, the safing sensor 49 issues a detection signal, which is based on the impact, to the ECU 4. The integration section 40c inputs the detection signal and then outputs an integral value. The collision determination section 42c inputs the integral value and compares the integral value to the determination threshold value held by the threshold value hold section 41c. When the integral value is greater than the determination threshold value, the collision determination section 42c concludes that a collision is encountered, and then outputs a detection signal of "Y", which indicates the result of determination.

At time t2, the disable determination section 47 makes the same determination as at time t1, and outputs a detection signal of "Y".

The initial determination section 480 of the activation circuit 48 inputs the detection signal of "Y", which is output from the disable determination section 47, makes the same determination as at time t1, and outputs a detection signal of "N".

The detection signal of "N" from the initial determination section 480 is input to the final determination section 481. The final determination section 481 inputs the detection signal from the initial determination section 480 and the detection signal indicative of the determination result of the safing sensor 49.

At time t2, the sensor 22 and the safing sensor 49 output a detection signal of "Y". In other words, at time t2, the final determination section 481 inputs the detection signal of "N" from the initial determination section 480 and the detection signal of "Y" indicative of the determination result of the safing sensor 49. As a result, the final determination section 481 (activation circuit 48) outputs a detection signal of "N" to the pretensioner 3 in order to prohibit the pretensioner 3 from being activated (started).

As described above, the vehicle-occupant protection system according to the present embodiment does not permit the pretensioner 3 to be activated (started) when a collision occurs rearward of the sensor 22. This suppresses a failure that may be caused by an unnecessary activation of the pretensioner 3.

(Collision Causing a Temporary Decrease in the Level of a Sensor Detection Signal)

Figure 12:
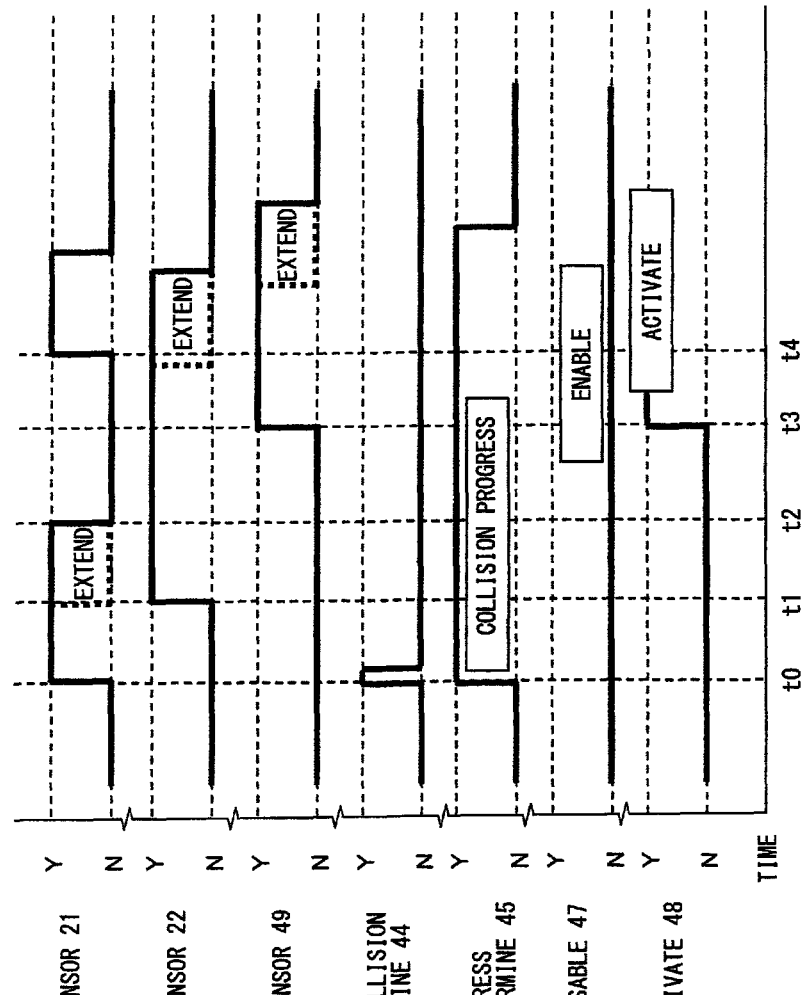
FIG. 12 is a diagram illustrating a determination state of the vehicle-occupant protection system according to the third embodiment concerning an oblique collision (temporarily identified as a non-collision state)

Operations that are performed by the vehicle-occupant protection system according to the present embodiment when a collision occurs to temporarily turn off the determination of a sensor will now be described in detail. Operations not described below are the same as those described in conjunction with the foregoing collisions. Determinations made by various sections of the vehicle-occupant protection system in the event of the above collision are shown in FIG. 12 in the same manner as in FIGS. 10 and 11.

The above collision is a collision that occurs at the same collision point as shown in FIG. 10 and temporarily reduces its impact on the sensor 21 before the collision is determined by the safing sensor 49, thereby causing the integral value to be smaller than the determination threshold value (determination condition).

The above collision is summarized below. At time t0, the sensor 21 determines that an oblique collision is encountered. At time t1, the sensor 22 determines that an oblique collision is encountered. At time t2, the integral value of the oblique collision detected by the sensor 21 decreases below the determination threshold value. At time t3, the safing sensor 49 determines that an oblique collision is encountered.

(Before Time t1)

In the event of the above collision, the sensors 21, 22 determine an encountered collision. During a period between time t0 and time t1, the determination of the collision and the determination of the activation (start) of the pretensioner 3 are made in the same manner as in the event of the foregoing oblique collision.

(Time t2)

Time t2, which is later than time t1, is now reached.

At time t2, the impact of the collision detected by the sensor 21 is temporarily decreased so that the integral value is smaller than the determination threshold value (determination condition). In other words, the determination result of the sensor 21 is a detection signal of "N". In this instance, the determination result of the sensor 22 continues to be a detection signal of "Y".

Even when the determination result of the sensor 21 is a detection signal of "N" at time t2, time t2 is reached before a predetermined period of time for the collision encountered at time t0 elapses. Thus, the collision progress determination circuit 45 of the ECU 4 concludes that a collision event is in progress, and then outputs a detection signal of "Y".

In other words, a state in which the determination of the collision and the determination of the activation (start) of the pretensioner 3 are made is maintained in the same manner as at time t1.

(Time t3)

Next, time t3, which is later than time t2, is reached.

At time t3, a detection signal of "Y" is output to indicate the determination result of the safing sensor 49.

Even at time t3, the collision progress determination circuit 45 makes a determination in the same manner as time t2. Therefore, the disable determination section 47 outputs a detection signal of "N".

The detection signal of "N", which is output from the disable determination section 47, is input to the initial determination section 480 of the activation circuit 48. The initial determination section 480 then makes the same determination as at time t1 and outputs a detection signal of "Y".

The detection signal of "Y", which is output from the initial determination section 480, is input to the final determination section 481. The final determination section 481 inputs the detection signal of "Y" from the initial determination section 480 and the detection signal of "Y" indicative of the determination result of the safing sensor 49.

As a result, the final determination section 481 (activation circuit 48) outputs a detection signal of "Y" to the pretensioner 3 in order to permit the pretensioner 3 to be activated (started).

Upon input of the detection signal of "Y", the pretensioner 3 becomes activated (starts) to bind the occupant in the occupant seat SFL (restrain the movement of the occupant) for occupant protection purposes.

As described above, even when the encountered collision is such that the determination result of the sensor 21 is temporarily represented by a detection signal of "N" as in the event of the above collision (even when the encountered collision is in a state prevailing between time t2 and time t4 in FIG. 12), the vehicle-occupant protection system according to the present embodiment can certainly activate the pretensioner 3. In other words, the vehicle-occupant protection system according to the present embodiment prevents the pretensioner 3 from performing an erroneous operation (failing to operate).

(Collision Involving an Extended Period of Sensor Determination)

Figure 13:
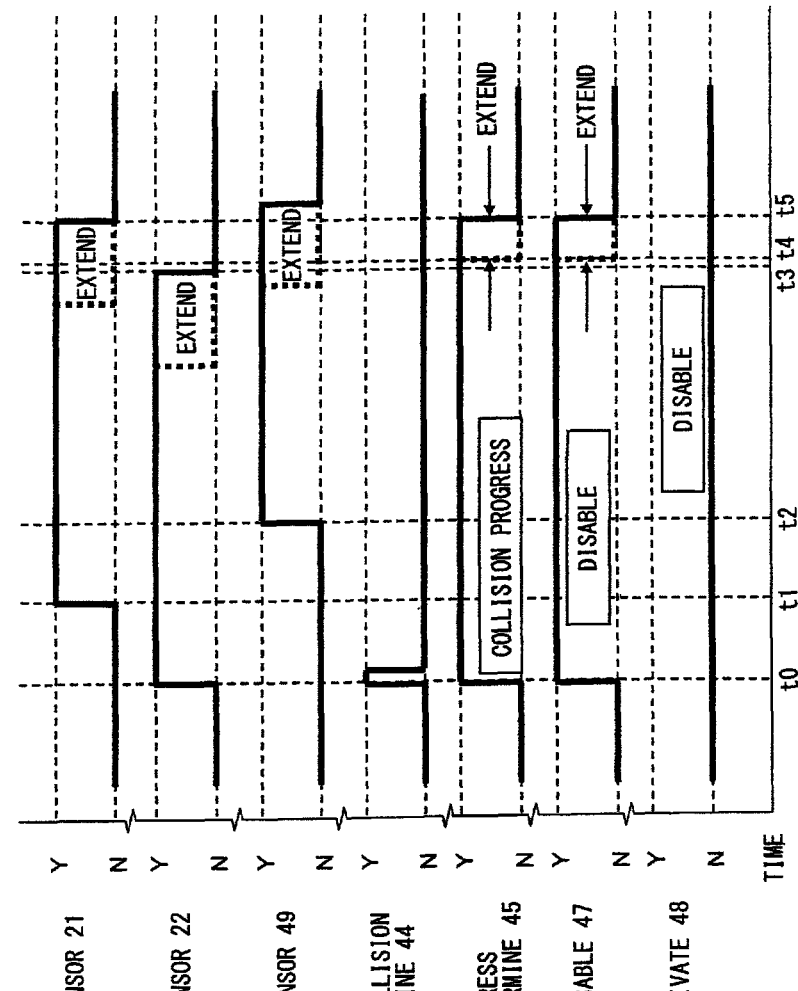
FIG. 13 is a diagram illustrating a determination state of the vehicle-occupant protection system according to the third embodiment concerning a rear oblique collision.

Operations that are performed by the vehicle-occupant protection system according to the present embodiment when a rear oblique collision occurs to involve an extended period of determination by the sensor 21 will now be described in detail. Operations not described below are the same as those described in conjunction with the foregoing oblique collision. Determinations made by various sections of the vehicle-occupant protection system in the event of the above collision are shown in FIG. 13 in the same manner as in FIGS. 10 to 12.

The above collision is a rear oblique collision that occurs at the same collision point as shown in FIG. 11 and causes the collision determination of the sensor 21 to continue even after the collision determination of the sensor 22 changes to a detection signal of "N".

The above rear oblique collision is summarized below. At time t0, the sensor 22 determines that a collision is encountered. At time t1, the sensor 21 determines that a collision is encountered. At time t2, the safing sensor 49 determines that a collision is encountered. At time t3, the sensor 22 no longer determines that a collision is encountered. At time t4, a predetermined period of time for determining the continuation of a collision has elapsed. At time t5, the sensor 21 no longer determines that a collision is encountered.

(Before Time t3)

In the event of the above collision, first of all, the determination of the collision and the determination of the activation (start) of the pretensioner 3 are made in the same manner as in the event of the foregoing rear collision during a period between time t0 and time t3.

(Time t4)

Even at time t4, which is later than time t3, because time t4 is reached before a predetermined period of time has elapsed (while the collision is determined to be ongoing), the collision progress determination circuit 45 in the ECU 4 concludes that the collision event is in progress, and then outputs a detection signal of "Y".

(Time t5)

Even at time t5, which is later than time t4, because time t5 is reached before a predetermined period of time has elapsed (while the collision is determined to be ongoing without convergence), the timer section 450 of the collision progress determination circuit 45 in the ECU 4 concludes that the collision event is in progress, and then outputs a detection signal of "Y". Meanwhile, in the present embodiment, the period of time during which the two sensors 21, 22 determine a collision is used as the predetermined period of time held by the collision progress determination circuit 45.

In other words, even when a rear collision occurs, the vehicle-occupant protection system according to the present embodiment prohibits the pretensioner 3 from being activated (started).

As described above, even when a collision is not determined by the sensor 22 to have occurred before the collision is not determined by the sensor 21 to have occurred as mentioned in conjunction with the above collision event, the vehicle-occupant protection system according to the present embodiment prohibits the pretensioner 3 from being activated. In other words, the vehicle-occupant protection system according to the present embodiment prevents the pretensioner 3 from performing an erroneous operation (failing to operate).

As described above, the vehicle-occupant protection system according to the present embodiment certainly activates (starts) the pretensioner 3 in the event of a collision that is determined as a collision by the sensor 21. This provides an advantage in that an erroneous operation of the pretensioner 3 is avoided.

As a result, the vehicle-occupant protection system according to the present embodiment is advantageous in that vehicle-occupant protection is certainly provided.

[Modifications of Foregoing Embodiments]

The vehicle-occupant protection system according to the present disclosure has been described in conjunction with the foregoing embodiments on the assumption that the occupant in the front left seat SFL is to be protected. However, the vehicle-occupant protection system according to the present disclosure may be applied to a situation where the occupant in any other seat SFR, SRR, SRL is to be protected.

Further, the vehicle-occupant protection system according to the present disclosure is not only applicable to a vehicle with two rows of occupant seats arranged in the direction of travel, but also applicable to a vehicle with three or more rows of occupant seats.

Figure 14:
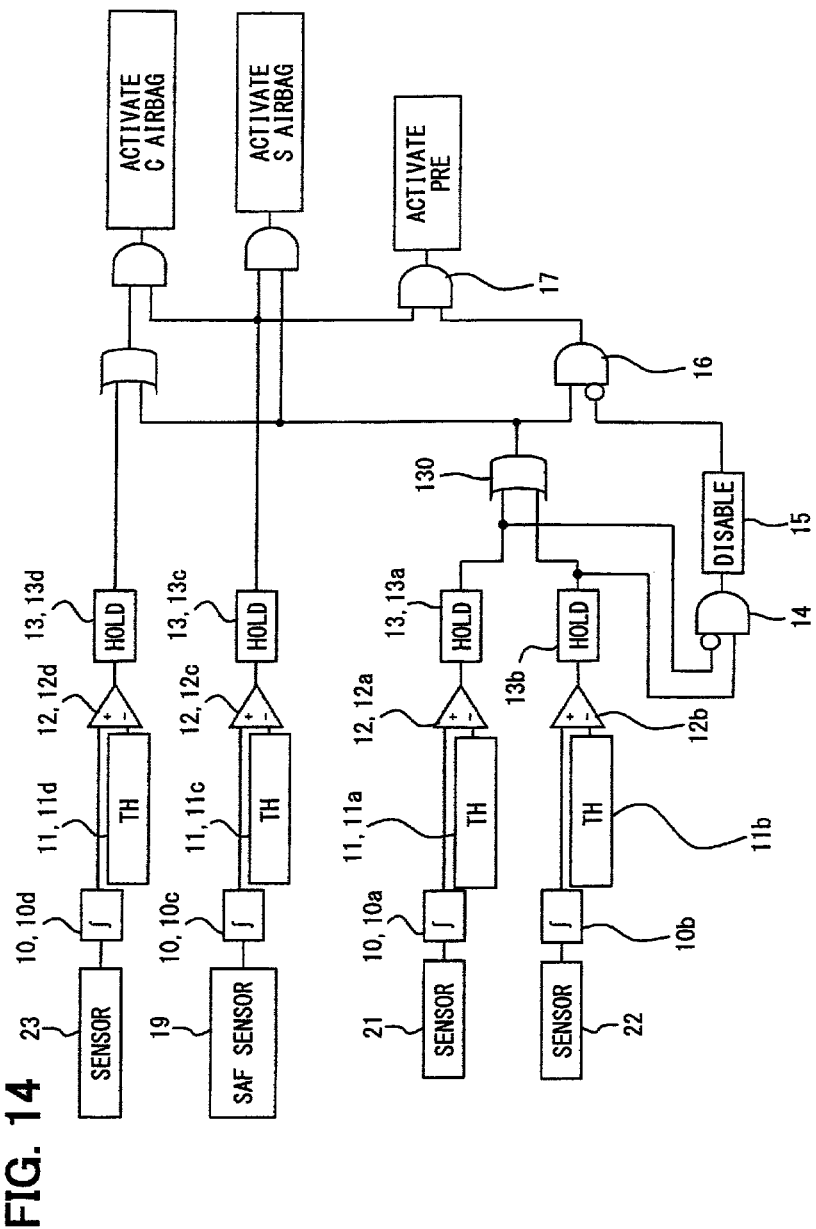
FIG. 14 is a diagram illustrating the configuration of the ECU in the vehicle-occupant protection system according to a modified embodiment.
Figure 15:
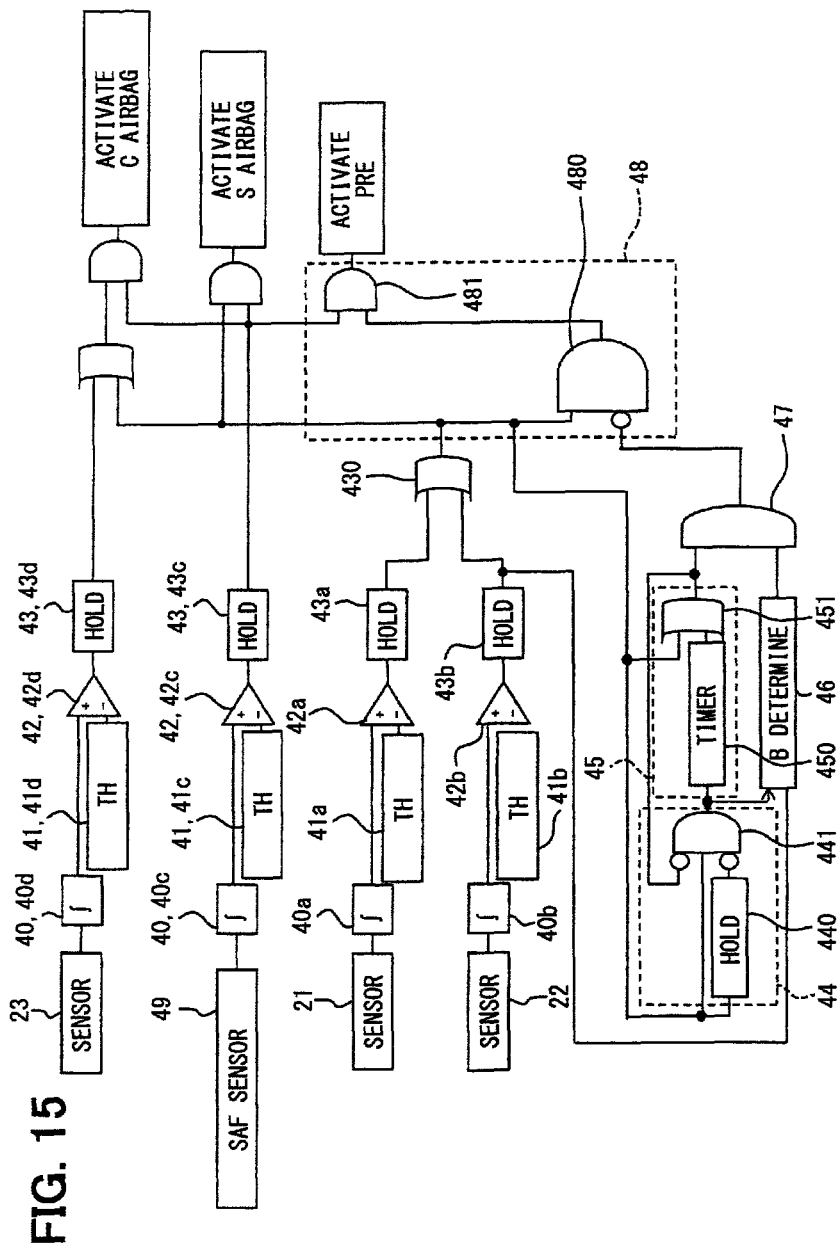
FIG. 15 is a diagram illustrating the configuration of the ECU in the vehicle-occupant protection system according to another modified embodiment.

Furthermore, the vehicle-occupant protection system according to the foregoing embodiments has been described in conjunction with operations performed to bind the occupant in the occupant seat with the pretensioner 3 in the event of an oblique collision. However, a protective device other than the pretensioner 3 may be incorporated. FIGS. 14 and 15 illustrate how the ECU 1, 4 is configured when a side airbag and a curtain airbag are incorporated to protect the occupant when a lateral collision occurs against the vehicle C.

FIG. 14 shows a modified embodiment in which a side airbag and a curtain airbag are added to the second embodiment. FIG. 15 shows a modified embodiment in which a side airbag and a curtain airbag are added to the third embodiment.

As shown in the figures, both of these modified embodiments additionally use a satellite sensor 23 that is built in a C-pillar of the vehicle C.

A detection signal from the satellite sensor 23 is processed through an integration section 10d, 40d, a threshold value hold section 11d, 41d, a collision determination section 12d, 42d, and an output extension section 13d, 43d and output as a collision determination result, as is the case with the detection signals of the sensors 21, 22. The threshold value hold section 11d, 41d holds the same determination threshold value as the determination threshold value for the determination of a collision.

When a collision occurs and the integral value exceeds the determination threshold value, the collision is determined to have occurred, and then the side airbag and curtain airbag are activated.

The above-described modified embodiments provide an advantage in that the occupant is protected not only from the above-mentioned oblique collision but also from a lateral collision.

Further, the above-described modified embodiments use the same sensors and ECU to activate (start) the airbags and the pretensioner 3. Therefore, the above-described modified embodiments provide an advantage in that the occupant can be protected without adding a new sensor.

While the present disclosure has been described with reference to preferred embodiments thereof, it is to be understood that the disclosure is not limited to the preferred embodiments and constructions. The present disclosure is intended to cover various modification and equivalent arrangements. In addition, while the various combinations and configurations, which are preferred, other combinations and configurations, including more, less or only a single element, are also within the spirit and scope of the present disclosure.

What is claimed is:

1. A vehicle-occupant protection system in a vehicle having a first lateral side and a second lateral side, the first lateral side being closer to an occupant seat of an occupant of the vehicle than the second lateral side, the system comprising:
   a first sensor that is disposed on the first lateral side and positioned either forward of or lateral to the occupant seat in a front-rear direction of the vehicle to detect a collision in a width direction of the vehicle;
   a second sensor that is disposed on the first lateral side and positioned rearward of the first sensor in a front-rear direction of the vehicle to detect a collision in a width direction of the vehicle;
   a movement restraint device that is provided to the occupant seat to restrain the occupant in the occupant seat from moving away from the occupant seat; and
   a collision determination section that compares a first detection signal from the first sensor and a second detection signal from the second sensor with a first determination threshold value and a second determination threshold value, respectively, to determine whether a collision has occurred,
   wherein the collision determination section concludes that a collision has occurred and activates the movement restraint device when the first detection signal from the first sensor exceeds the first determination threshold value in a situation where the second detection signal from the second sensor has not exceeded the second determination threshold value.

2. The vehicle-occupant protection system according to claim 1, wherein
wherein the collision determination section disables activation of the movement restraint device when the second detection signal from the second sensor exceeds the second determination threshold value in a situation where the first detection signal from the first sensor has not exceeded the first determination threshold value.

3. The vehicle-occupant protection system according to claim 2, wherein
the activation of the movement restraint device is disabled until a predetermined period of disable time elapses.

4. The vehicle-occupant protection system according to claim 1, further comprising
a safing sensor to detect a widthwise collision of the vehicle and provide redundancy of the first sensor, and activate the movement restraint device when a third detection signal from the safing sensor exceeds a third determination threshold value.

5. The vehicle-occupant protection system according to claim 1, wherein
the first sensor is disposed in a vehicle door, whereas the second sensor is disposed in a vehicle pillar.

6. A vehicle-occupant protection system in a vehicle having a first lateral side and a second lateral side, the first lateral side being closer to an occupant seat of an occupant of the vehicle than the second lateral side, the system comprising:
a first sensor that is disposed on the first lateral side and positioned either forward of or lateral to the occupant seat in a front-rear direction of the vehicle to detect a collision in a width direction of the vehicle;
a second sensor that is disposed on the first lateral side and positioned rearward of the first sensor in a front-rear direction of the vehicle to detect a collision in a width direction of the vehicle;
a safing sensor to detect a collision in a width direction of the vehicle and provide redundancy of the first sensor;
a movement restraint device that is provided to the occupant seat to restrain the occupant in the occupant seat from moving away from the occupant seat; and
a collision determination section that compares a first detection signal from the first sensor, a second detection signal from the second sensor, and a third detection signal from the safing sensor with a first determination threshold value, a second determination threshold value, and a third determination threshold value, respectively, to perform a determination of an occurrence of a collision,
the collision determination section including a determination hold section that holds a state of the determination of each of the first sensor and the second sensor, the state of the determination being referenced whether to indicate an occurrence of a collision when the first detection signal of the first sensor exceeds the first determination threshold value or the second detection signal of the second sensor exceeds the second determination threshold value,
wherein:
at a first time when the first detection signal of the first sensor exceeds the first determination threshold value, the collision determination section concludes that a collision has occurred under a condition that the state of the determination held at the first time by the determination hold section does not indicate an occurrence of a collision while the second detection signal of the second sensor has not exceeded the second determination threshold value at the first time; and
the collision determination section activates the movement restraint device when the third detection signal of the safing sensor exceeds the third determination threshold value following concluding that the collision has occurred.

7. The vehicle-occupant protection system according to claim 6, wherein
until a predetermined first period of time elapses since a determination of an occurrence of a collision is made based on the first detection signal having exceeded the first determination threshold value or the second detection signal having exceeded the second determination threshold value, the determination hold section continues to hold the state of the determination indicating the occurrence of the collision under a consideration that the collision whose determination of the occurrence is made is ongoing.

8. The vehicle-occupant protection system according to claim 7, wherein
the predetermined first period of time is extended until the collision is determined to have terminated.

9. The vehicle-occupant protection system according to claim 6, wherein
at a second time when the second detection signal of the second sensor exceeds the second determination threshold value, the collision determination section disables activation of the movement restraint device under a condition that the state of the determination held at the second time by the determination hold section does not indicate an occurrence of a collision while the first detection signal of the first sensor has not exceeded the first determination threshold value at the second time.

10. The vehicle-occupant protection system according to claim 9, wherein
the activation of the movement restraint device is disabled until a predetermined period of disable time elapses.

11. The vehicle-occupant protection system according to claim 10, wherein
the predetermined first period of disable time is a period until an oblique collision is determined to have terminated.

12. The vehicle-occupant protection system according to claim 6, wherein
while the state of the determination held by the determination hold section indicates an occurrence of a oblique collision, performing a determination of an occurrence of a collision of the first sensor or the second sensor is disabled.

13. The vehicle-occupant protection system according to claim 6, wherein
the first sensor is disposed in a vehicle door, whereas the second sensor is disposed in a vehicle pillar.

* * * * *